United States Patent
Okamoto et al.

(10) Patent No.: US 10,901,129 B2
(45) Date of Patent: Jan. 26, 2021

(54) POLARIZING FILM, METHOD FOR PRODUCING SAME, OPTICAL FILM, AND IMAGE DISPLAY DEVICE

(71) Applicant: NITTO DENKO CORPORATION, Ibaraki (JP)

(72) Inventors: Masayuki Okamoto, Ibaraki (JP); Satoshi Mita, Ibaraki (JP); Yoshimi Konno, Ibaraki (JP); Taiyan Jiang, Ibaraki (JP); Tetsuro Ikeda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 142 days.

(21) Appl. No.: 16/094,303

(22) PCT Filed: Mar. 6, 2017

(86) PCT No.: PCT/JP2017/008739
§ 371 (c)(1),
(2) Date: Oct. 17, 2018

(87) PCT Pub. No.: WO2017/183334
PCT Pub. Date: Oct. 26, 2017

(65) Prior Publication Data
US 2019/0137673 A1    May 9, 2019

(30) Foreign Application Priority Data

Apr. 20, 2016  (JP) ................................. 2016-084757

(51) Int. Cl.
*C09J 4/00*    (2006.01)
*C09J 133/00*    (2006.01)
(Continued)

(52) U.S. Cl.
CPC ...... *G02B 5/3025* (2013.01); *B29D 11/00644* (2013.01); *B32B 7/12* (2013.01);
(Continued)

(58) Field of Classification Search
None
See application file for complete search history.

(56) References Cited

U.S. PATENT DOCUMENTS

2008/0252973 A1   10/2008   Akari et al.
2013/0293949 A1   11/2013   Saito et al.
(Continued)

FOREIGN PATENT DOCUMENTS

JP    2006-45474 A    2/2006
JP    2008-174658 A   7/2008
(Continued)

OTHER PUBLICATIONS

Notification of Transmittal of Translation of the International Preliminary Report on Patentabililty (Form PCT/IB/338) issued in counterpart International Application No. PCT/JP2017/008739 dated Nov. 1, 2018 with Forms PCT/IB/373 and PCT/ISA/237 (8 pages).
(Continued)

*Primary Examiner* — Derek S. Chapel
(74) *Attorney, Agent, or Firm* — Westerman, Hattori, Daniels & Adrian, LLP

(57) ABSTRACT

A polarizing film, wherein transparent protective films are laid, respectively, on/over both surfaces of a polarizer to interpose an adhesive layer (a) and an adhesive layer (b), respectively, between both the surfaces and the transparent protective films. The adhesive layer (a) has a glass transition temperature of −60° C. or higher and lower than 40° C. The adhesive layer (b) has a glass transition temperature of 40° C. or higher. The adhesive layer (a) is a layer formed in the form of a cured product layer yielded by radiating an active
(Continued)

energy ray to an active-energy-ray-curable adhesive composition (a). The active-energy-ray-curable adhesive composition (a) comprises at least one or more radical polymerizable compounds, and when a total amount of the radical polymerizable compound(s) is defined as 100% by weight, one or more alkyl (meth)acrylates (A) (each) having 10 to 20 carbon atoms are comprised in a proportion of 15% or more by weight.

19 Claims, 1 Drawing Sheet

(51) Int. Cl.
```
B32B 7/12      (2006.01)
C09J 11/06     (2006.01)
G02B 5/30      (2006.01)
G02F 1/1335    (2006.01)
B29D 11/00     (2006.01)
G02F 1/13363   (2006.01)
C09J 7/38      (2018.01)
```
(52) U.S. Cl.
CPC ............... *C09J 4/00* (2013.01); *C09J 11/06* (2013.01); *C09J 133/00* (2013.01); *G02B 5/3033* (2013.01); *G02F 1/1335* (2013.01); *G02F 1/13363* (2013.01); *G02F 1/133528* (2013.01); *C09J 7/38* (2018.01); *G02F 2001/133638* (2013.01); *G02F 2202/28* (2013.01)

(56) References Cited

U.S. PATENT DOCUMENTS

| | | | |
|---|---|---|---|
| 2015/0125632 A1* | 5/2015 | Lee | G02F 1/1306 428/1.5 |
| 2015/0299520 A1 | 10/2015 | Mansei et al. | |
| 2019/0106599 A1* | 4/2019 | Okamoto | C09J 4/00 |
| 2019/0136091 A1* | 5/2019 | Okamoto | G02B 5/3083 |
| 2019/0136101 A1* | 5/2019 | Okamoto | C09J 139/04 |

FOREIGN PATENT DOCUMENTS

| | | |
|---|---|---|
| JP | 2008-287207 A | 11/2008 |
| JP | 2010-282161 A | 12/2010 |
| JP | 2012-68593 A | 4/2012 |
| JP | 2012-144690 A | 8/2012 |
| JP | 2014-152225 A | 8/2014 |
| JP | 2015-143848 A | 8/2015 |
| WO | 2014/061611 A1 | 4/2014 |
| WO | 2015/099022 A1 | 7/2015 |

OTHER PUBLICATIONS

International Search Report dated May 23, 2017, issued in counterpart application No. PCT/JP2017/008739 (2 pages).
Office Action dated Aug. 25, 2020, issued in counterpart CN application No. 201780023953.1, with English translation. (18 pages).
Office Action dated Jul. 9, 2020, issued in counterpart JP application No. 2016-084757, with English translation. (7 pages).
Office Action dated Apr. 30, 2020, issued in counterpart JP Application No. 2016-084757, with English Translation. (7 pages).
Office Action dated Sep. 9, 2020, issued in counterpart TW application No. 106107776, with English translation. (9 pages).
Office Action dated Nov. 13, 2020, issued in counterpart KR Application No. 10-2018-7025781, with English translation (14 pages).

* cited by examiner

[Figure 1]
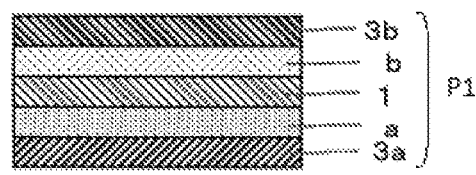
[Figure 2]
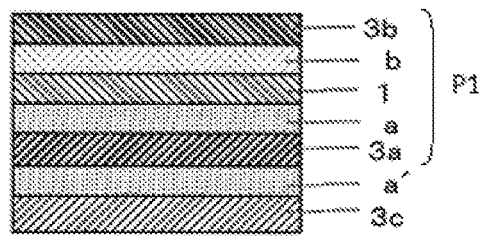
[Figure 3]
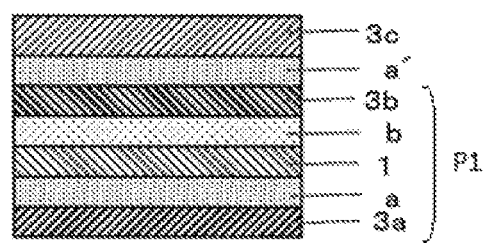

POLARIZING FILM, METHOD FOR PRODUCING SAME, OPTICAL FILM, AND IMAGE DISPLAY DEVICE

TECHNICAL FIELD

The present invention relates to a polarizing film in which a polarizer and a transparent protective film are laminated onto each other through an adhesive layer made from an active-energy-ray-curable adhesive composition, and a method for producing the polarizing film. This polarizing film is usable singly or in the form of an optical film on/over which this polarizing film is laminated, so as to form an image display device such as a liquid crystal display device (LCD), an organic EL display device, a CRT or a PDP.

BACKGROUND ART

In watches, portable telephones, PDAs, notebook PCs, monitors for personal computers, DVD players, TVs and others, liquid crystal display devices have been rapidly developing in the market. A liquid crystal display device is a device making the state of polarized light visible by switching of a liquid crystal. In light of the display principle thereof, a polarizer is used. In particular, TVs and other articles have been increasingly required to be higher in brightness and contrast, and wider in viewing angle. Their polarizing film has also been increasingly required to be higher in transmittance, polarization degree, color reproducibility, and others.

As a polarizer, an iodine based polarizer has been most popularly and widely used, which has a structure obtained by adsorbing iodine onto, for example, a polyvinyl alcohol (hereinafter also referred to merely as a "PVA") and then stretching the resultant. A generally used polarizing film is a polarizing film in which transparent protective films are bonded, respectively, onto both surfaces of a polarizer through the so-called water based adhesive, in which a polyvinyl alcohol based material is dissolved in water. For the transparent protective films, for example, triacetylcellulose is used, which has a high moisture permeability.

In the case of using a water based adhesive such as a polyvinyl alcohol based adhesive (the so-called wet lamination) when a polarizing film is produced, a drying step is required after the transparent protective films are bonded to the polarizer. In order to improve polarizing films in producibility in recent years, suggestions have been made about polarizing films each using an active-energy-ray-curable adhesive, instead of the water based adhesive, not to require any drying step (Patent Documents 1 to 4).

Patent Documents 1 to 3 each suggest a polarizing film using an adhesive layer designed to have a Tg (glass transition temperature) of 60° C. or higher. The polarizing film using this adhesive layer is useful for preventing its polarizer from being cracked when the polarizing film is subjected to a heating and freezing cycle test (heat shock cycle test). Patent Document 4 suggests a polarizing film using an adhesive layer having a Tg of −80 to 0° C. About this polarizing film, it is stated that its polarizer is good in adhering strength onto a specified protective film, and the polarizing film is good in punching-out workability.

PRIOR ART DOCUMENTS

Patent Documents

Patent Document 1: JP-A-2008-287207
Patent Document 2: JP-A-2012-068593
Patent Document 3: JP-A-2012-144690
Patent Document 4: JP-A-2010-282161

SUMMARY OF THE INVENTION

Problems to be Solved by the Invention

However, in the polarizing film described in each of Patent Documents 1 to 3, its adhesive layer is high in Tg; thus, in a drop test as gives an impact to this layer, the layer is peeled off so that the polarizing film is not sufficient in endurance. Moreover, in many cases, in order that an active-energy-ray-curable adhesive which forms the adhesive layer can ensure adhesion onto any polarizer, a composition for this adhesive makes use of a hydrophilic monomer, such as hydroxyethylacrylamide or acryloylmorpholine, in a major proportion. Thus, the adhesive is not necessarily sufficient in water resistance. In Patent Document 4, the adhesive layer is low in Tg. Thus, when this adhesive layer low in Tg is used for a polarizer, and transparent protective films onto both surfaces of this polarizer, there is caused a problem that the polarizer is cracked when the polarizing film is subjected to a heating and freezing cycle test (heat shock cycle test).

An object of the present invention is to provide a polarizing film that can be prevented from being cracked by heat shock, and is good in endurance against being peeled in a drop test and good in water resistance; and a method for producing the polarizing film.

Another object of the present invention is to provide an optical film using the polarizing film, and an image display device using the polarizing film or the optical film.

Means for Solving the Problems

In order to solve the above-mentioned problems, the inventors have made eager investigations to find out that the problems can be solved by a polarizing film and others that are described below. Thus, the present invention has been accomplished.

The present invention relates to a polarizing film in which transparent protective films are laid, respectively, on/over both surfaces of a polarizer to interpose an adhesive layer (a) and an adhesive layer (b), respectively, between both the surfaces and the transparent protective films; the adhesive layer (a) on/over one of both the surfaces has a glass transition temperature of −60° C. or higher and lower than 40° C.; the adhesive layer (b) on/over the other surface has a glass transition temperature of 40° C. or higher; the adhesive layer (a) is a layer formed in the form of a cured product layer yielded by radiating an active energy ray to an active-energy-ray-curable adhesive composition (a); and the active-energy-ray-curable adhesive composition (a) includes at least one or more radical polymerizable compounds, and when a total amount of the radical polymerizable compound (s) is defined as 100% by weight, one or more alkyl (meth)acrylates (A) (each) having 10 to 20 carbon atoms are included in a proportion of 15% or more by weight.

It is preferred in the polarizing film that the active-energy-ray-curable adhesive composition (a) includes, as the alkyl (meth)acrylate(s) (A), an alkyl (meth)acrylate (A1) having 10 to 14 carbon atoms, and an alkyl (meth)acrylate (A2) having 15 to 20 carbon atoms.

It is preferred in the polarizing film that in the active-energy-ray-curable adhesive composition (a), a ratio by weight of the component (A1) to the component (A2) (A1/A2) is from 1.0/9.0 to 4.0/6.0.

It is preferred in the polarizing film that the active-energy-ray-curable adhesive composition (a) includes the following in an amount of 3% or more by weight at the time of defining the total amount of the radical polymerizable compound(s) as 100% by weight: one or more nitrogen-containing monomers (B) selected from the group consisting of (meth)acrylamide derivatives, amino-group-containing monomers, and nitrogen-containing and heterocycle-containing vinyl monomers.

It is preferred in the polarizing film that the active-energy-ray-curable adhesive composition (a) further includes a polyfunctional radical polymerizable compound.

It is preferred in the polarizing film that in the active-energy-ray-curable adhesive composition (a), the polyfunctional radical polymerizable compound is an alkylene di(meth)acrylate having 7 to 12 carbon atoms.

It is preferred in the polarizing film that the active-energy-ray-curable adhesive composition (a) includes not only the radical polymerizable compound(s) but also an acrylic oligomer obtained by polymerizing a (meth)acrylic monomer.

It is preferred in the polarizing film that the active-energy-ray-curable adhesive composition (a) includes a radical polymerizable compound having a hydroxyl group.

It is preferred in the polarizing film that the active-energy-ray-curable adhesive composition (a) includes not only the radical polymerizable compound (s) but also a silane coupling agent.

It is preferred in the polarizing film that in the active-energy-ray-curable adhesive composition (a), the silane coupling agent is a silane coupling agent having no radical polymerizable functional group.

It is preferred in the polarizing film that the active-energy-ray-curable adhesive composition (a) includes a radical polymerizable compound having an active methylene group, and a radical polymerization initiator having hydrogen-withdrawing effect.

It is preferred in the polarizing film that in the active-energy-ray-curable adhesive composition (a), the active methylene group is an acetoacetyl group.

It is preferred in the polarizing film that in the active-energy-ray-curable adhesive composition (a), the radical polymerizable compound having the active methylene group is acetoacethoxyalkyl (meth)acrylate.

It is preferred in the polarizing film that in the active-energy-ray-curable adhesive composition (a), the radical polymerization initiator is a thioxanthone based radical polymerization initiator.

The present invention also relates to a method for producing the polarizing film recited in any one of the paragraphs concerned, this method including: a first painting step of painting an adhesive composition (b) for forming the adhesive layer (b) to at least one surface of the polarizer and one of the transparent protective films; a first bonding step of bonding the polarizer and the transparent protective film to each other; a first adhering step of causing the polarizer and the one transparent protective film to adhere to each other through the adhesive layer (b) yielded by curing the adhesive composition (b); a second painting step of painting an active-energy-ray-curable adhesive composition (a) for forming the adhesive layer (a) to at least one surface of the polarizer and the other transparent protective film; a second bonding step of bonding the polarizer and the transparent protective film to each other; and a second adhering step of radiating the active energy ray to the resultant workpiece to cure the active-energy-ray-curable adhesive composition (a) to yield the adhesive layer (a), and causing the polarizer and the other transparent protective film to adhere to each other through the yielded adhesive layer (a); or a method for producing the polarizing film the paragraphs concerned, this method including: a painting step of painting an active-energy-ray-curable adhesive composition (b) for forming the adhesive layer (b) to at least one surface of the polarizer and one of the transparent protective films; another painting step of painting an active-energy-ray-curable adhesive composition (a) for forming the adhesive layer (a) to at least one surface of the polarizer and the other transparent protective film; a bonding step of bonding the polarizer to the transparent protective films; and an adhering step of radiating the active energy ray to the resultant workpiece to cure the active-energy-ray-curable adhesive compositions (a) and (b) to yield the adhesive layer (a) and the adhesive layer (b), and causing the transparent protective films to adhere to the polarizer through the yielded adhesive layer (a) and the yielded adhesive layer (b), respectively.

It is preferred in the method for producing the polarizing film that the active energy ray shows a ratio of 100:0 to 100:50, this ratio being a ratio between an integrated illuminance of rays in a wavelength range from 380 to 440 nm and an integrated illuminance of rays in a wavelength range from 250 to 370 nm.

Furthermore, the present invention relates to an optical film, wherein at least one polarizing film as described in any one of the paragraphs concerned is laminated; or an image display device, using a polarizing film as described in anyone of the paragraphs concerned, or an optical film as described in the paragraph concerned.

Effect of the Invention

In the polarizing film of the present invention, transparent protective films are laid, respectively, on/over both surfaces of a polarizer to interpose adhesive layers each made from an active-energy-ray-curable adhesive composition, respectively, between both the surfaces and the transparent protective films. On/over one of both the surfaces, one of the transparent protective films is laid through one of the adhesive layers that is an adhesive layer (a) low in glass transition temperature (hereinafter referred to also as Tg), which has a Tg of −60° C. or more and lower than 40° C., while on/over the other surface, the other transparent protective film is laid through the other adhesive layer that is an adhesive layer (b) high in Tg, which has a Tg of 40° C. or higher. According to the adhesive layer (b) high in Tg, the polarizer and the transparent protective films on both the sides of the polarizer can be prevented from being cracked by heat shock. According to the adhesive layer (a) low in Tg, the polarizing film is good in endurance against being peeled in a drop test, and good in water resistance to be good in the above-mentioned property, and is further good in water resistance. As described just above, in the polarizing film of the present invention, the adhesive layers (a) and (b) different from each other in glass transition temperature are laid, respectively, on both the sides of the polarizer. Thus, the invention allows to provide a polarizing film that can be prevented from being cracked by heat shock, and is good in endurance against being peeled in a drop test and good in water resistance.

Furthermore, in the present invention, the active-energy-ray-curable adhesive composition, from which the adhesive layer (a) low in Tg, the Tg being −60° C. or higher and lower than 40° C., is made, includes one or more alkyl (meth)acrylates (A) having 10 to 20 carbon atoms in a predetermined amount; thus, an adhesive layer yielded by curing this composition can maintain a high adhesion water-resistance even in a high humidity environment as causes dew condensation, or in an environment in which this layer is immersed in water. When the active-energy-ray-curable adhesive composition includes, in particular, an alkyl (meth) acrylate (A1) having 10 to 14 carbon atoms and an alkyl (meth)acrylate (A2) having 15 to 20 carbon atoms as the alkyl (meth)acrylate(s) (A), the cured and formed adhesive layer can be improved in adhesion water-resistance and impact resistance with a good balance.

The polarizing film of the present invention is in particular favorable in heating buckling resistance and impact resistance when the polarizer included in the polarizing film has a thickness of 1 to 10 μm to be a thin polarizer. The thin polarizer is small in the above-mentioned dimension change, so that the polarizer undergoes a dimension change relatively larger than the dimension change of the transparent protective films, or any optical film other than polarizers. Consequently, the thin polarizer tends to show a poorer heating buckling resistance than polarizers each having a thickness of 10 μm or more. Moreover, the thin polarizer has a higher elastic modulus than the polarizers, the thickness of which is 10 μm or more, to tend to be poorer in impact absorption than the polarizers, the thickness of which is 10 μm or more. As described above, the polarizing film of the present invention has the adhesive layer having an alkyl (meth)acrylate (A) having 10 to 20 carbon atoms in a predetermined amount; accordingly, the polarizing film can satisfy endurance and water resistance even when a thin polarizer is used.

BRIEF DESCRIPTION OF THE DRAWINGS

FIG. 1 is a sectional view illustrating an embodiment of the polarizing film of the present invention.

FIG. 2 is a sectional view illustrating an embodiment of the polarizing film of the invention.

FIG. 3 is a sectional view illustrating an embodiment of the polarizing film of the invention.

MODE FOR CARRYING OUT THE INVENTION

FIGS. 1 to 3 are each a sectional view illustrating an embodiment of the polarizing film of the present invention. In a polarizing film (P1) illustrated in FIG. 1, a transparent protective film (3a) is laid on one of the two surfaces of a polarizer (1) to interpose, therebetween, an adhesive layer (a). A transparent protective film (3b) is laid on the other surface of the polarizer (1) to interpose, therebetween, an adhesive layer (b). The adhesive layers (a) and (b) are each formed in the form of a cured product layer yielded by radiating an active energy ray to an active-energy-ray-curable adhesive composition.

The adhesive layer (a) has a glass transition temperature of −60° C. or higher and lower than 40° C., and the active-energy-ray-curable adhesive composition (a) from which the adhesive layer (a) is made includes a radical polymerizable compound as a curable component. The adhesive layer (a) is good in endurance against being peeled in a drop test, and good in water resistance. The glass transition temperature of the adhesive layer (a) is preferably from −40 to 0° C., more preferably from −30 to −5° C., in particular preferably from −30 to −10° C. in order to make the adhesive layer (a) good in endurance against being peeled in a drop test, and good in water resistance.

The adhesive layer (b) has a glass transition temperature of 40° C. or higher, so that the polarizer (1) and the transparent protective film (3b) are strongly bonded to each other through the adhesive layer (b) to be good in endurance, and can be prevented from being cracked by heat shock. The wording "being cracked by heat shock" or "heat shock crack" means a phenomenon that, for example, when a polarizer is shrunken, the polarizer is cracked in a stretched direction thereof. In order to prevent this phenomenon, it is important that a polarizer is restrained from being expanded and shrunken in a heat shock temperature range (from −40 to 60° C.). The adhesive layer (b) can be restrained from being abruptly changed in elastic modulus in the heat shock range, so as to be decreased in expanding and shrinking forces acting to the polarizer, so that the generation of heat shock crack can be prevented. The adhesive layer (b) is selected to give a glass transition temperature of 30° C. or higher. The glass transition temperature is preferably 60° C. or higher, more preferably 70° C. or higher, even more preferably 80° C. or higher. If the glass transition temperature of the adhesive layer (b) is too high, the polarizing plate is lowered in flexibility. Thus, the glass transition temperature of the adhesive layer (b) is preferably 300° C. or lower, more preferably 240° C. or lower, even more preferably 180° C. or lower. The difference in glass transition temperature between the adhesive layer (a) and the adhesive layer (b) is preferably set to 60° C. or higher from the viewpoint of the advantageous effects of the present invention.

As far as in the polarizing film (P1) of the present invention, the transparent protective film (3a) is laid on one of the two surfaces of the polarizer (1) to interpose, therebetween, the adhesive layer (a) and further the transparent protective film (3b) is laid on the other surface of the polarizer (1) to interpose, therebetween, the adhesive layer (b), an optical film (3c) other than polarizers may be laid through another adhesive layer onto one of the transparent protective film (3a) side and the transparent protective film (3b) side of the polarizing film. The optical film other than polarizers may be any optical film that may be used in a liquid crystal display device or the like, examples of the film including a retardation film (examples thereof including wavelength plates such as a half wavelength plate, and a quarter wavelength plate), a viewing angle compensation film, a brightness enhancement film, a reflector, and a transreflector. In FIG. 2, an optical film (3c) other than polarizers is further laid on the transparent protective film (3a) side of the polarizing film (P1) in FIG. 1. In FIG. 3, an optical film (3c) other than polarizers is further laid on the transparent protective film (3b) side of the polarizing film (P1) in FIG. 1. An adhesive layer used to laminate the optical film (3c) is preferably an adhesive layer (a') formed in the form of a cured product layer yielded by radiating an active energy ray to an active-energy-ray-curable adhesive composition. The adhesive layer (a') may be the same as the adhesive layer (a). The optical film (3c) other than polarizers is preferably a retardation film. In each of FIGS. 2 and 3, the single transparent protective film (3c) is laid through the adhesive layer (a'). However, on one of the transparent protective film (3a) side and the transparent protective film (3b) side of the polarizing film of the present invention, for example, the adhesive layers (a') is combined with optical films (3c) to laminate the optical films (3c), which are other than polarizers, onto each other, the number of these optical films being two or more.

The adhesive layer (a) can be formed in the form of a cured product layer of an active-energy-ray-curable adhesive composition (a). Hereinafter, a description will be made about the active-energy-ray-curable adhesive composition usable in the present invention.

The active-energy-ray-curable adhesive composition (a) may be an electron beam curable, or ultraviolet curable adhesive. Ultraviolet curable adhesives can be roughly classified into radical polymerization curable adhesives, and cationic polymerization curable adhesives.

A curable component of each of the radical polymerization curable adhesives may be a compound having a (meth) acryloyl group or a radical polymerizable compound having a vinyl group. The curable component may be a monofunctional component or a bi- or higher polyfunctional component. Such curable components may be used singly or in any combination of two or more thereof. The curable component is preferably, for example, a compound having a (meth) acryloyl group.

A curable component of each of the cationic polymerization curable adhesives may be a compound having an epoxy group, oxetanyl group or vinyl group. The compound having an epoxy group is not particularly limited as far as the compound is a compound having in the molecule thereof at least one epoxy group, and the compound may be a generally known curable epoxy compound that may be of various types. A preferred example of the epoxy compound is a compound having in the molecule thereof at least two epoxy groups and at least one aromatic ring (hereinafter referred to as an "aromatic epoxy compound"); or a compound having at least two epoxy groups in which at least one of these groups is formed between adjacent two carbon atoms included in an alicyclic ring.

As the active-energy-ray-curable adhesive, a liquid substance is used which does not substantially contain any organic solvent and further has a viscosity of 1 to 100 cp/25° C. The use of this liquid substance allows to form a thin adhesive layer (a) having a thickness of 0.1 to 5 μm. The point that the adhesive of the liquid substance is used to form the adhesive layer (a) is different from the point that a pressure-sensitive-adhesive layer used to form a pressure-sensitive-adhesive layer does not show any liquid substance form. Also from this point, a difference is evident between the adhesive layer and the pressure-sensitive-adhesive layer. The above-mentioned viscosity is preferably from 5 to 100 cp/25° C., more preferably from 10 to 70 cp/25° C. The wording "does not substantially contain any organic solvent" means that the active-energy-ray-curable adhesive may contain an organic solvent in a proportion of 10% or less by weight of the whole of the active-energy-ray-curable adhesive. The content of the organic solvent is preferably 5% or less by weight, more preferably 3% or less by weight. The organic solvent is a liquid having a flashing point of 40° C. or lower. The active-energy-ray-curable adhesive may not contain any organic solvent.

<Alkyl (Meth)acrylate Having 10 to 20 Carbon Atoms>

The active-energy-ray-curable adhesive composition (a), from which the adhesive layer (a) can be made, contains when a total amount of the radical polymerizable compound (s) is defined as 100% by weight, one or more alkyl (meth)acrylates (A) (each) having 10 to 20 carbon atoms in a proportion of 15% or more by weight of the whole of the radical polymerizable compound(s).

The alkyl (meth)acrylate(s) (A) having 10 to 20 carbon atoms is/are (each), for example, an alkyl (meth)acrylate having a linear or branched alkyl group having 10 to 20 carbon atoms. Examples of the alkyl group include decyl, isodecyl, dodecyl, isomyristyl, lauryl, tridecyl, pentadecyl, hexadecyl, heptadecyl, stearyl, and isostearyl groups. These may be used singly or in combination. For example, the following alkyl (meth)acrylate is preferably used: isodecyl acrylate, lauryl acrylate (Tg: 15° C.), stearyl acrylate (Tg: 30° C.), or isostearyl acrylate (Tg: ~18° C.)

The proportion of the alkyl (meth)acrylate(s) (A) needs to be 15% or more by weight of the whole of the active-energy-ray-curable adhesive compounds to cause the resultant active-energy-ray-curable adhesive to satisfy adhesion water-resistance and impact resistance. The proportion is preferably from 17 to 90% by weight, more preferably from 20 to 50% by weight.

When the active-energy-ray-curable adhesive composition (a) includes, as the alkyl (meth)acrylate(s) (A), the alkyl (meth)acrylate (A1) having 10 to 14 carbon atoms and the alkyl (meth)acrylate (A2) having 15 to 20 carbon atoms, the cured and formed adhesive layer can be improved in adhesion water-resistance and impact resistance with a good balance. In the case of optimizing, particularly, the blend ratio between the alkyl (meth)acrylate (A1) having 10 to 14 carbon atoms and the alkyl (meth)acrylate (A2) having 15 to 20 carbon atoms, the adhesive layer can be made higher in adhesion water-resistance and impact resistance. Specifically, the ratio by weight of the component (A1) to the component (A2) (A1/A2) is preferably from 1.0/9.0 to 4.0/6.0, more preferably from 1.5/8.5 to 3.0-7.0.

<Nitrogen-Containing Monomer (B)>

The active-energy-ray-curable adhesive composition (a) preferably includes at least one nitrogen-containing monomer (B) in a proportion of 3% or more by weight of the whole of the radical polymerizable compounds blended into the composition, this component (B) being selected from the group consisting of (meth)acrylamide derivatives, amino-group-containing monomers, and nitrogen-containing and heterocycle-containing vinyl monomers, to make the composition higher in adhering strength to an adherend. Considering the adhering strength to the adherend, the nitrogen-containing monomer (B) is contained more preferably in a proportion of 20% or more by weight of the whole of the blended radical polymerizable compound (s), the proportion thereof being 100% by weight.

Examples of the nitrogen-containing monomer (B) include hydroxyethylacrylamide, N-methylolacrylamide, and other hydroxyl-group-containing alkylacrylamides; acryloyl morpholine and other cyclic amide compounds; acryloylmorpholine, and other cyclic amide compounds; N-methoxymethylacrylamide, N-ethoxymethylacrylamide, and other alkoxyalkylacrylamides; N-vinylcaprolactam, N-vinyl-2-pyrrolidone, and other heterocycle-containing compounds; dimethylaminoethylacrylamide, and other amino-group-containing monomers; dimethylaminoethyl acrylate, imethylamino methacrylate, and other nitrogen-containing and acryloyl-group-containing monomers; diethylacrylamide, dimethylacrylamide, and other dialkyl (meth)acrylamides; and N-vinylformamide (trade name: "BEAM SET 770", manufactured by Arakawa Chemical Industries, Ltd.). Out of these examples, preferred are acryloylmorpholine, N-vinyl-2-pyrrolidone, diethylacrylamide, and dimethylacrylamide.

<Polyfunctional Radical Polymerizable Compound>

The polyfunctional radical polymerizable compound is a compound having at least two radical polymerizable functional groups each having an unsaturated double bond, such as a (meth)acryloyl group or a vinyl group. Examples of the polyfunctional radical polymerizable compound include tetraethylene glycol diacrylate (Tg of a homopolymer thereof, which will be referred to only as Tg hereinafter: 50° C.) polyethylene glycol diacrylate, polypropylene glycol diacrylates (n=3, Tg: 69° C.), (n=7, Tg: −8° C.) and (n=12, Tg: −32° C.) and other polyalkylene glycol diacrylates, neopentyl glycol diacrylate (Tg: 117° C.), 3-methyl-1,5-pentanediol diacrylate (Tg: 105° C.), 1,6-hexanediol diacrylate (Tg: 63° C.), 1,9-nonanediol diacrylate (Tg: 68° C.), a mixture (Tg: 88° C.) of 2-methyl-1,8-octanediol diacrylate and 1,9-nonanediol diacrylate, dimethylol-tricyclodecane diacrylate (Tg: 75° C.) an EO adduct diacrylate of bisphenol A (Tg: 75° C.), bisphenol F EO-modified (n=2) diacrylate (Tg: 75° C.), bisphenol A EO-modified (n=2) diacrylate (Tg: 75° C.), isocyanuric acid EO-modified diacrylate (Tg: 166° C.), trimethylolpropane triacrylate (Tg: 250° C. or higher), trimethylolpropane PO-modified triacrylates (n=1, Tg: 120° C.) and (n=2, Tg: 50° C.), trimethylolpropane EO-modified triacrylates (n=1, Tg: unmeasured) and (n=2, Tg: 53° C.), isocyanuric acid EO-modified di- and tri-acrylates (di: 30 to 40%, Tg: 250° C. or higher), and (di: 3 to 13%, Tg: 250° C. or higher), pentaerythritol tri- and tetra-acrylates (tri: 65 to 70%, Tg: 250° C. or higher), (tri: 55 to 63%, Tg: 250° C. or higher), (tri: 40 to 60%, Tg: 250° C. or higher), (tri: 25 to 40%, Tg: 250° C. or higher) and (tri: less than 10%, Tg: 250° C. or higher), ditrimethylolpropane tetraacrylate (Tg: 250° C. or higher), dipentaerythritol penta- and hexa-acrylates (penta: 50 to 60%, Tg: 250° C. or higher), (penta: 40 to 50%, Tg: 250° C. or higher), (penta: 30 to 40%, Tg: 250° C. or higher), (penta: 25 to 35%, Tg: 250° C. or higher) and (penta: 10 to 20%, Tg: 250° C. or higher), and respective (meth)acrylates corresponding to these compounds. Other examples of the polyfunctional radical polymerizable compound include oligomer (meth)acrylates such as various polyurethane (meth)acrylates, polyester (meth)acrylates, and polyepoxy (meth)acrylates. The polyfunctional radical polymerizable compound (A) is also preferably a commercially available product. Examples thereof include products LIGHT ACRYLATE 4EG-A, LIGHT ACRYLATE 9EG-A, LIGHT ACRYLATE NP-A, LIGHT ACRYLATEMPD-A, LIGHT ACRYLATE 1.6HX-A, LIGHT ACRYLATE 1.9ND-A, LIGHT ACRYLATE MOD-A, LIGHT ACRYLATE DCP-A, and LIGHT ACRYLATE BP-4EAL (each manufactured by Kyoeisha Chemical Co., Ltd.), ARONIXs M-208, M-211B, M-215, M-220, M-225, M-270, M-240, M-309, M-310, M-321, M-350, M-360, M-313, M-315, M-306, M-305, M-303, M-452, M-450, M-408, M-403, M-400, M-402, M-404, M-406, M-405, M-1100, M-1200, M-6100, M-6200, M-6250, M-6500, M-7100, M-7300, M-8030, M-8060, M-8100, M-8530, M-8560, and M-9050 (each manufactured by Toagosei Co., Ltd.), and SR-531 (manufactured by SARTOMER Inc.) and CD-536 (manufactured by SARTOMER Inc.). The polyfunctional radical polymerizable compound (A) is preferably a homopolymer having a Tg of −40 to 100° C.

The proportion of the polyfunctional radical polymerizable compound is preferably from 1 to 65% by weight of the whole of the radical polymerizable compounds in the active-energy-ray-curable adhesive, the proportion of the whole being 100% by weight. When the proportion is set to 1% or more by weight, the adhesive layer (a) favorably satisfies impact resistance, heating buckling resistance, and polarizer cracking resistance.

Out of the above-mentioned polyfunctional radical polymerizable compounds, the polyfunctional radical polymerizable compound that is an alkylene di(meth)acrylate having 7 to 12 carbon atoms is high in affinity with both species of the alkyl (meth)acrylate(s) (A), which is/are high in hydrophobicity, and the nitrogen-containing monomer (B), which is high in hydrophilicity, so that the adhesive composition is restrained from undergoing phase separation to be easily improved in liquid stability. Thus, the polyfunctional radical polymerizable compound is preferably usable.

The alkylene di(meth)acrylate having 7 to 12 carbon atoms is, for example, 1,9-nonanediol diacrylate (trade name: "LIGHT ACRYLATE 1.9ND-A", manufactured by Kyoeisha Chemical Co., Ltd.). The proportion of the alkylene di (meth)acrylate having 7 to 12 carbon atoms as the polyfunctional radical polymerizable compound is preferably from 2 to 35%, more preferably from 4 to 25%, even more preferably from 6 to 15% by weight of the whole of the radical polymerizable compounds.

<Alkyl (Meth)acrylate Having Alkyl Group Having 2 to 9 Carbon Atoms>

The active-energy-ray-curable adhesive composition (a) may include an alkyl (meth)acrylate having an alkyl group having 2 to 9 carbon atoms as a radical polymerizable compound that is a monofunctional radical polymerizable compound. The alkyl (meth)acrylate is, for example, an alkyl (meth)acrylate having a linear or branched alkyl group having 2 to 9 carbon atoms. Examples of the alkyl group include ethyl, propyl, isopropyl, n-butyl, isobutyl, amyl, hexyl, cyclohexyl, heptyl, 2-ethylhexyl, isooctyl, nonyl, and isononyl groups. These groups may be used singly or in combination. The alkyl (meth)acrylate having 2 to 9 carbon atoms is preferably an alkyl (meth)acrylate that can give a homopolymer satisfying a Tg of −80 to 60° C. from the viewpoint of the endurance of the resultant polarizing film against the peeling of the film in a drop test, and the water resistance of the film. It is preferred to use, for example, the following: ethyl acrylate (Tg: −20° C.), n-propyl acrylate (Tg: 8° C.), n-butyl acrylate (Tg: −45° C.), isobutyl acrylate (Tg: −26° C.), t-butyl acrylate (Tg: 14° C.), isoamyl acrylate (Tg: −45° C.), cyclohexyl acrylate (Tg: 8° C.), 2-ethylhexyl acrylate (Tg: −55° C.), n-octyl acrylate (Tg: −65° C.) isooctyl acrylate (Tg: −58° C.), or isononyl acrylate (Tg: −58° C.)

<Radical Polymerizable Compound Having Hydroxyl Group>

The active-energy-ray-curable adhesive composition (a), from which the adhesive layer (a) can be made, may include, as a radical polymerizable compound that is a monofunctional radical polymerizable compound, a (meth)acrylate having a hydroxyl group. The (meth)acrylate having a hydroxyl group may be a (meth)acrylate having a (meth)acryloyl group and a hydroxyl group. Specific examples of the (meth)acrylate having a hydroxyl group include 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and other hydroxyalkyl (meth)acrylates each having an alkyl group having 2 to 12 carbon atoms; (4-hydroxymethylcyclohexyl)-methyl acrylate, and other alicyclic-skeleton-containing and hydroxyl-group-containing monomers; and 2-hydroxy-3-phenoxypropyl acrylate (trade name: ARONIX M5700, manufactured by Toagosei Co., Ltd.) and other aromatic-ring-containing and hydroxyl-group-containing monomers. The (meth)acrylate having a hydroxyl group is preferably a (meth)acrylate that can give a homopolymer satisfying a Tg of −80 to 40° C. from the viewpoint of the endurance of the resultant polarizing film against the peeling of the film in a drop test. It is preferred to use, for example, hydroxyethyl acrylate (Tg: −15° C.), hydroxypropyl acrylate (Tg: −7° C.), or hydroxybutyl acrylate (Tg: −32° C.)

The (meth)acrylate having a hydroxyl group may be a (meth)acrylate having a large chain length between the hydroxyl group and its (meth)acryloyl group. When the chain length is large between the hydroxyl group and the (meth)acryloyl group, hydroxyl groups of molecules of this (meth)acrylate are more easily aligned to an adherend film so that adhesion based on the polarity of the hydroxyl groups is favorably given more effectively to the adhesive. The (meth)acrylate having a hydroxyl group in which between the hydroxyl group and its (meth)acryloyl group the chain length is large is preferably a hydroxyl-group-containing monofunctional (meth)acrylate having a weight-average molecular weight of 160 to 3000. The weight-average molecular weight of the hydroxyl-group-containing monofunctional (meth)acrylate is more preferably from 200 to 2000, most preferably from 300 to 1000. About the hydroxyl-group-containing monofunctional (meth)acrylate having a weight-average molecular weight of 160 to 3000, the chain length between the hydroxyl group and the (meth)acryloyl group is preferably large, and the hydroxyl group and the (meth)acryloyl group are present, respectively, at both terminals of the (meth)acrylate (having, in particular, a linear structure).

If the weight-average molecular weight of the (meth)acrylates having a hydroxyl group is too large, the active-energy-ray-curable adhesive becomes high in viscosity to give an uneven painted thickness so that the painted layer unfavorably becomes poor in external appearance, or in the bonding step, air bubbles enter the layer so that the layer unfavorably becomes poor in external appearance. Furthermore, the number of hydroxyl groups in this layer is relatively decreased so that the adhesive layer unfavorably does not gain an adhesion-giving effect based on the polarity of the hydroxyl groups with ease. Examples of the hydroxyl-group-containing monofunctional (meth)acrylate having a weight-average molecular weight of 160 to 3000 include any one that satisfies a weight-average molecular weight of 160 to 3000 out of the above-mentioned hydroxyalkyl (meth)acrylates, polyethylene glycol mono(meth)acrylate, polypropylene glycol mono(meth)acrylate, polyethylene glycol/polyethylene glycol mono(meth)acrylate, and other polyalkylene glycol mono(meth)acrylates; and caprolactone-modified products of any one of the above-mentioned hydroxyalkyl (meth)acrylates, and (4-hydroxymethylcyclohexyl)-methyl acrylate. The caprolactone-modified products are preferably caprolactone-added products of hydroxyethyl (meth)acrylate. The addition amount of caprolactone is particularly preferably 1 to 5 mol.

The proportion of the (meth)acrylate having a hydroxyl group is 70% or less by weight of the whole of the radical polymerizable compounds in the active-energy-ray-curable adhesive, the proportion of the compounds being 100% by weight, to cause the resultant laminated polarizing film to satisfy impact resistance, and heating buckling resistance. If this proportion is large, an effect of the hydrophilicity of the hydroxyl groups is increased so that the layer is unfavorably deteriorated in water resistance. Thus, for example, the layer is peeled off in a humidifying environment. In the case of using, as the (meth)acrylate having a hydroxyl group, a hydroxyalkyl (meth)acrylate or (4-hydroxymethylcyclohexyl)-methyl acrylate, the proportion thereof is preferably from 10 to 60% by weight, more preferably from 20 to 50% by weight. In the case of using, as the (meth)acrylate having a hydroxyl group, a hydroxyl-group containing monofunctional (meth)acrylate having a weight-average molecular weight of 160 to 3000, the proportion thereof is preferably from 1 to 70%, more preferably from 30 to 60% by weight of the whole of the radical polymerizable compounds in the active-energy-ray-curable adhesive composition, the proportion of the compounds being 100% by weight.

The active-energy-ray-curable adhesive composition (a) preferably contains, as the radical polymerizable compound having a hydroxyl group, a compound represented by the following general formula (I):

[Formula 1]

wherein X is a functional group including a reactive group, and R$^1$ and R$^2$ each represent a hydrogen atom. When the active-energy-ray-curable adhesive composition contains the compound represented by the formula (I), adhesion water-resistance is very dramatically improved between an adhesive layer formed through/after the curing of the composition, and the polarizer or any one of the transparent protective films subjected to activating treatment.

The group X, which the compound represented by the general formula (I) has, is a functional group including a reactive group, and is a functional group that can react with another curable component contained in the adhesive composition. Examples of the reactive group, which X includes, include hydroxyl, amino, aldehyde, carboxyl, vinyl, (meth)acryl, styryl, (meth)acrylamide, vinyl ether, epoxy, and oxetane groups. When the adhesive composition used in the present invention is active-energy-ray curable, the reactive group, which X includes, is preferably at least one reactive group selected from the group consisting of vinyl, (meth)acryl, styryl, (meth)acrylamide, vinyl ether, epoxy, oxetane, and mercapto groups. When the adhesive composition is, particularly, radical polymerizable, the reactive group, which X includes, is preferably at least one reactive group selected from the group consisting of (meth)acryl, styryl, and (meth)acrylamide groups. It is more preferred that the compound represented by the general formula (I) has a (meth)acrylamide group since the compound is high in reactivity to be increased in copolymerization rate in the active-energy-ray-curable adhesive composition. This case is preferred also since the (meth)acrylamide group is high in polarity so that the resultant adhesive is excellent in adhesion to produce the advantageous effects of the present invention effectively. When the adhesive composition used in the invention is cationic polymerizable, the reactive group, which X includes, has preferably at least one reactive group selected from the group consisting of hydroxyl, amino, aldehyde, carboxyl, vinyl ether, epoxy, oxetane, and mercapto groups. When the reactive group has, in particular, an epoxy group, adhesion between the resultant curable resin layer and an adherend is favorably excellent. When the reactive group has a vinyl ether group, the adhesive composition is favorably excellent in curability.

Preferred and specific examples of the compound represented by the general formula (I) include the following compounds (Ia) to (Id), in which X is a functional group including a reactive group bonded to a boron atom to interpose, therebetween, a phenylene or alkylene group:

[Formula 2]

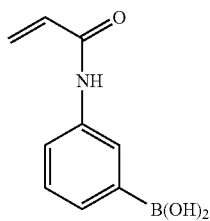
(Ia)

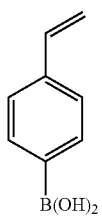
(Ib)

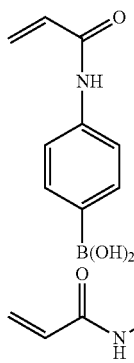
(Ic)

In the present invention, the compound represented by the general formula (I) may be a compound in which a reactive group is bonded directly to a boron atom. However, as illustrated as the above-mentioned specific examples, it is preferred that the compound represented by the general formula (I) is a compound in which a reactive group and a boron atom are bonded to each other to interpose, therebetween, a phenylene or alkylene group, that is, that X is a functional group including a reactive group bonded to a boron atom to interpose, therebetween, a phenylene or alkylene group. When the compound represented by the general formula (I) is, for example, a compound in which X is bonded to a reactive group to interpose, therebetween, an oxygen atom bonded to a boron atom, an adhesive layer yielded by curing an adhesive composition including this compound tends to be deteriorated in adhesion water-resistance. In the meantime, when the compound represented by the general formula (I) is not a compound having a boron-oxygen atom, but a compound in which a boron atom is bonded to a phenylene group or alkylene group, so that while this compound has a boron-carbon bond, the compound contains a reactive group, the resultant adhesive layer is favorably improved in adhesion water-resistance. In the present invention, the compound represented by the general formula (I) is preferably a compound in which a reactive group and a boron atom may be bonded to each other to interpose, therebetween, an organic group which has 1 to 20 carbon atoms and may have a substituent since an adhesive layer yielded through/after the curing of the adhesive composition is also improved in adhesion water-resistance. The organic group, which has 1 to 20 carbon atoms and may have a substituent, is, for example, a linear or branched alkylene group which has 1 to 20 carbon atoms and may have a substituent, a cyclic alkylene group which has 3 to 20 carbon atoms and may have a substituent, a phenylene group which has 6 to 20 carbon atoms and may have a substituent, or a naphthylene group which has 10 to 20 carbon atoms and may have a substituent.

Examples of the compound represented by the general formula (I) include, besides the compounds given above as the examples thereof, an ester made from hydroxyethylacrylamide and boric acid, an ester made from methylolacrylamide and boric acid, an ester made from hydroxyethyl acrylate and boric acid, an ester made from hydroxybutyl acrylate and boric acid, and any other ester made from a (meth)acrylate and boric acid.

The content of the compound represented by the general formula (I) in the adhesive composition is preferably from 0.001 to 50%, more preferably from 0.1 to 30%, most preferably from 1 to 10% by weight to improve the adhesion between the polarizer and the curable resin layer, and the water resistance of the two and, in particular, to improve the adhesion and the water resistance when the polarizer is bonded to a transparent protective film through the adhesive layer.

The active-energy-ray-curable adhesive composition (a) preferably contains, as the radical polymerizable compound having a hydroxyl group, a compound represented by the following general formula (II):

[Formula 3]

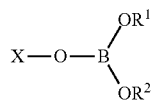
(II)

wherein X is a functional group including at least one reactive group selected from the group consisting of vinyl, (meth)acryl, styryl, (meth)acrylamide, vinyl ether, epoxy, oxetane, and mercapto groups, and $R^1$ and $R^2$ each represent a hydrogen atom. When the active-energy-ray-curable adhesive composition includes the compound represented by the general formula (II), adhesion water-resistance is very dramatically improved between an adhesive layer formed through/after the curing of the composition, and the polarizer or anyone of the transparent protective films subjected to activating treatment. The above-mentioned aliphatic hydrocarbon group is, for example, a linear or branched alkyl group which has 1 to 20 carbon atoms and may have a substituent, a cyclic alkyl group which has 3 to 20 carbon atoms and may have a substituent, or an alkenyl group which has 2 to 20 carbon atoms. The aryl group is, for example, a phenyl group which has 6 to 20 carbon atoms and may have a substituent, or a naphthyl group which has 10 to 20 carbon atoms and may have a substituent. The heterocyclic group is, for example, a 5-membered or 6-membered group which contains at least one heteroatom, and may have a substituent. These may be linked to each other to form a ring.

The functional group X, which the compound represented by the general formula (II) has, contains a reactive group. Examples of the reactive group include hydroxyl, amino, aldehyde, carboxyl, vinyl, (meth)acryl, styryl, (meth)acrylamide, vinyl ether, epoxy, oxetane groups. When the curable resin composition used in the present invention is active-energy-ray curable, the reactive group X is preferably at least one reactive group selected from the group consisting of vinyl, (meth)acryl, styryl, (meth)acrylamide, vinyl ether, epoxy, and oxetane groups. When the curable resin composition is, particularly, radical polymerizable, the reactive group is at least one reactive group selected from the group consisting of (meth)acryl, styryl, and (meth)acrylamide groups. More preferably, the compound represented by the general formula (II) has a (meth)acrylamide group since the compound is high in reactivity to be increased in copolymerization rate in the active-energy-ray-curable resin composition. Moreover, this case is preferred also since the (meth)acrylamide group is high in polarity so that the resultant adhesive is excellent in adhesion. Consequently, the advantageous effects of the present invention can be effectively gained. When the curable resin layer used in the present invention is cationic polymerizable, the reactive group X preferably has at least one functional group selected from the group consisting of hydroxyl, amino, aldehyde, carboxyl, vinyl ether, epoxy, oxetane, and mercapto groups. When the reactive group X has, particularly, an epoxy group, the adhesion between the resultant curable resin layer and an adherend is favorably excellent. When the reactive group has a vinyl ether group, the curable resin composition is favorably excellent in curability.

When the functional group X, which the compound represented by the general formula (II) has, is a functional group represented by the following general formula (III):

[Formula 4]

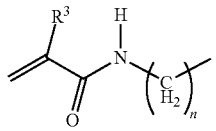

(III)

wherein, $R^3$ is a hydrogen atom or a methyl radical, and n is an integer of 1 to 4, a cure resin layer yielded by curing the curable resin composition containing the crosslinking agent is excellent in compatibility with a water-soluble resin, such as polyvinyl alcohol, so that an active-energy-ray-curable functional group, such as a (meth)acryloyl group, can be effectively introduced into the water-soluble resin. Additionally, when the curable resin layer containing the crosslinking agent is located to contact the water-soluble resin, this layer is excellent in adhesion to the water-soluble resin. In the general formula (III), $R^3$ is a hydrogen atom or a methyl group. $R^3$ is preferably a hydrogen atom since the resultant composition is excellent in curability. In the formula (III), n is preferably from 1 to 4. If n is 5 or more, the compound is lowered in compatibility with the water-soluble resin so that a crosslinked structure of the water-soluble resin, which is an advantageous effect of the present invention, is not easily gained, or the distance between crosslinked points in the structure becomes long so that the adhesive layer does not unfavorably gain water resisting effect with ease. The compound represented by the general formula (III) is in particular preferably an ester made from hydroxyethyl acrylate and boric acid, or an ester made from hydroxybutyl acrylate and boric acid.

Also when the functional group X, which the compound represented by the general formula (II) has, is a functional group represented by the following general formula (IV):

[Formula 5]

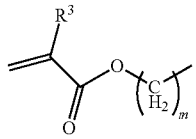

(IV)

wherein $R^3$ is a hydrogen atom or a methyl group, and m is an integer of 1 to 4, the following is attained in the same way as described above: a cure resin layer yielded by curing the curable resin layer containing the crosslinking agent is excellent in compatibility with a water-soluble resin, such as polyvinyl alcohol, so that an active-energy-ray-curable functional group, such as a (meth)acryloyl group, can be effectively introduced into the water-soluble resin; and additionally, when the curable resin layer containing the crosslinking agent is located to contact the water-soluble resin, this layer is excellent in adhesion to the water-soluble resin. In the general formula (IV), $R^3$ is a hydrogen atom or a methyl group. $R^3$ is preferably a hydrogen atom since the resultant composition is excellent in curability. In the formula (3), n is preferably from 1 to 4. If n is 5 or more, the compound is lowered in compatibility with the water-soluble resin so that a crosslinked structure of the water-soluble resin, which is an advantageous effect of the present invention, is not easily gained, or the distance between the crosslinked points becomes long so that the adhesive layer does not unfavorably gain water resisting effect with ease. The compound represented by the general formula (3) is in particular preferably an ester made from hydroxyethyl acrylate and boric acid, or an ester made from hydroxybutyl acrylate and boric acid.

When the compound represented by the general formula (II) is incorporated into the curable resin composition and the resultant is used as an adhesive for a water-soluble resin film, the compound represented by the general formula (II) is incorporated into the resin composition in a proportion that is preferably 0.01% or more, more preferably 1% or more by weight. About the compound represented by the general formula (II), its borate group acts onto a surface of the water-soluble resin film; thus, a very small addition amount thereof allows to produce an effect of improving adhesion between the composition and the film. However, if the content by proportion thereof is too small, the adhesion-improving effect is not easily gained. The upper limit of the proportion of the compound represented by the general formula (II) in the curable resin composition is, for example, 80% by weight. The proportion is preferably 50% or less, more preferably 30% or less, most preferably 10% or less by weight. The compound represented by the general formula (II) is usable alone as an adhesive for a water-soluble resin film.

<Measurement of Weight-Average Molecular Weight>

The weight-average molecular weight of the hydroxyl-group-containing monofunctional (meth)acrylate is measurable by GPC (gel permeation chromatography). Detector: differential refractometer (RI), and standard sample: polystyrene.

<Different Radical Polymerizable Compound>

The active-energy-ray-curable adhesive composition (a) which can form the adhesive layer (a) may include, as a radical polymerizable compound, a radical polymerizable compound different from the above-mentioned radical polymerizable compounds.

Specific examples of the different radical polymerizable compound include ybutyrolactone acrylate (trade name: "GBLA", manufactured by Osaka Organic Chemical Industry Ltd.), acrylic acid, acrylic acid dimer (trade name: "β-CEA", Daicel Corp.), o-carboxy-polycaprolactone monoacrylate (trade name: "ARONIX M5300", manufactured by Toagosei Co., Ltd.), glycidyl methacrylate (trade name: "LIGHT ESTER G", manufactured by Kyoeisha Chemical Co., Ltd.), acrylic acid multimer esters of tetrahydrofurfuryl alcohol (trade name: "VISCOAT #150D", manufactured by Osaka Organic Chemical Industry Ltd.), dicyclopentenyl acrylate (trade name: "FANCRYL FA-511AS", manufactured by Hitachi Chemical Co., Ltd.), butyl acrylate (trade name: "BUTYL ACRYLATE", manufactured by Mitsubishi Chemical Corp.), dicyclopentanyl acrylate (trade name: "FANCRYL FA-513AS", manufactured by Hitachi Chemical Co. Inc.), isobornyl acrylate (trade name: "LIGHT ACRYLATE IB-XA", manufactured by Kyoeisha Chemical Co., Ltd.), a neopentyl glycol acrylic acid adduct of hydroxypivalic acid (trade name: "LIGHT ACRYLATE HPP-A", manufactured by Kyoeisha Chemical Co., Ltd.), and o-phenylphenol EO-modified acrylate (trade name: "FANCRYL FA-301A", manufactured by Hitachi Chemical Co., Ltd.), phenoxy diethylene glycol acrylate (trade name "LIGHT ACRYLATE P2H-A" manufactured by Kyoeisha Chemical Co.), and other aromatic ring-containing monomers.

The proportion of the different radical polymerizable compound is preferably 40% or less by weight of the whole of the radical polymerizable compounds in the active-energy-ray-curable adhesive composition, the proportion of the compounds being 100% by weight, from the viewpoint of the adhesion, the endurance and the water resistance of the adhesive layer. The proportion is preferably from 2 to 25%, more preferably from 5 to 20% by weight.

<Silane Coupling Agent Having No Polymerizable Group>

The active-energy-ray-curable adhesive composition (a) may contain a silane coupling agent besides the radical polymerizable compounds. The silane coupling agent is preferably a silane coupling agent having no radical polymerizable functional group. The silane coupling agent having no radical polymerizable functional group acts on a surface of the polarizer to give a higher water resistance to the polarizer.

A specific example of the silane coupling agent having no radical polymerizable functional group is a silane coupling agent having an amino group. Specific examples of the silane coupling agent having an amino group include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and other amino-group-containing silanes; and N-(1,3-dimethylbutylidene)-3-(triethoxysilyl)-1-propaneamin e, and other ketimines type silanes.

The silane coupling agent having an amino group is preferably γ-aminopropyltrimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, or N-(1,3-dimethylbutylidene)-3-(triethoxysilyl)-1-propanamine Specific examples of the silane coupling agent which has no radical polymerizable functional group and which is other than the silane coupling agent having an amino group include 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

Examples of a silane coupling agent as an active-energy-ray-curable compound include vinyltrichlorosilane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Such silane coupling agents may be used singly or in any combination of two or more thereof. The blend amount of the silane coupling agent having no radical polymerizable functional group is usually 20 parts or less, preferably from 0.01 to 20 parts, more preferably from 0.05 to 15 parts, even more preferably from 0.1 to 10 parts by weight for 100 parts by weight of the whole of the radical polymerizable compounds in the active-energy-ray-curable adhesive. If the blend amount is more than 20 parts or more by weight, the adhesive may be unfavorably deteriorated in storability.

<Acrylic Oligomer Yielded by Polymerizing (Meth)acrylic Monomer>

The active-energy-ray-curable adhesive composition (a) may contain, besides the radical polymerizable compounds, an acrylic oligomer yielded by polymerizing a (meth)acrylic monomer. The matter that the active-energy-ray-curable adhesive contains the acrylic oligomer allows to decrease a curing shrinkage of the composition when the composition is irradiated with an active energy ray to be cured, so as to decrease interfacial stress between the adhesive, and adherends such as the polarizing film (P) and the optical films (3). Consequently, the adhesion between the adhesive layer and the adherends can be restrained from being lowered.

The active energy ray-curable adhesive is preferably low in viscosity, considering the workability and uniformity thereof when the adhesive is painted. Thus, the acrylic oligomer yielded by polymerizing a (meth)acrylic monomer is also preferably low in viscosity. The acrylic oligomer that is low in viscosity and can prevent a curing shrinkage of the resultant adhesive layer is preferably an oligomer having a weight-average molecular weight (Mw) of 15000 or less. The weight-average molecular weight is more preferably 10000 or less, in particular preferably 5000 or less. In the meantime, in order to restrain a curing shrinkage of the cured product layer (adhesive layer) sufficiently, the weight-average molecular weight (Mw) of the acrylic oligomer is preferably 500 or more, more preferably 1000 or more, in particular preferably 1500 or more. Specific examples of the (meth)acrylic monomer, from which the acrylic oligomer is made, include methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, S-butyl (meth)acrylate, t-butyl (meth)acrylate, n-pentyl (meth)acrylate, t-pentyl (meth) acrylate, 3-pentyl (meth)acrylate, 2,2-dimethylbutyl (meth) acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, N-octadecyl (meth)acrylate, and other alkyl (meth)acrylates (1-20 carbon atoms); cycloalkyl (meth)acrylates (such as cyclohexyl (meth)acrylate, and cyclopentyl (meth)acrylate); aralkyl (meth)acrylates (such as benzyl (meth)acrylate); polycyclic (meth) acrylate (such as 2-isobornyl (meth)acrylate, 2-norbornylmethyl (meth)acrylate, 5-norbornene-2-yl-methyl (meth)acrylate, and 3-methyl-2-norbornylmethyl (meth)acrylate); hydroxyl-group-containing (meth)acrylates (such as hydroxyethyl (meth)acrylate, 2-hydroxypropyl (meth)acrylate, and 2,3-dihydroxypropylmethyl-butyl (meth)acrylate); alkoxy-group- or phenoxy-group-containing (meth)acrylates (such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, and phenoxyethyl (meth)acrylate); epoxy-group-containing (meth)acrylates (such as glycidyl (meth)acrylate); halogen-containing (meth)acrylates (such as 2,2,2-trifluoroethyl (meth)acrylate, 2,2,2-trifluoroethyl (meth)acrylate, tetrafluoropropyl (meth)acrylate, hexafluoropropyl (meth)acrylate, octafluoropentyl (meth)acrylate, and heptadecafluorodecyl (meth)acrylate); and alkylaminoalkyl (meth)acrylates (such as dimethylaminoethyl (meth) acrylate). These (meth)acrylates may be used singly or in any combination of two or more thereof. Specific examples of the acrylic oligomer (E) include products "ARUFON" manufactured by Toagosei Co., Ltd., "ACTFLOW" manufactured by Soken Chemical & Engineering Co., Ltd., and "JONCRYL" manufactured by BASF Japan Ltd.

Usually, the blend amount of the acrylic oligomer is preferably 30 parts or less by weight for 100 parts by weight of the radical polymerizable compounds in the active-energy-ray-curable adhesive. If the content of the acrylic oligomer in the composition is too large, the reaction rate is intensely lowered when the composition is irradiated with an active energy ray, so that the curing of the composition may become poor. In the meantime, in order to restrain a curing shrinkage of the cured product layer (adhesive layer a) sufficiently, the composition contains the acrylic oligomer in an amount that is preferably 3 parts or more, more preferably 5 parts or more by weight.

<Radical Polymerizable Compound Having Active Methylene Group, and Radical Polymerization Initiator Having Hydrogen-Withdrawing Effect>

The active-energy-ray-curable adhesive composition (a) may further contain, besides the radical polymerizable compounds, a radical polymerizable compound having an active methylene group, and a radical polymerization initiator having hydrogen-withdrawing effect. This structure makes a remarkable improvement of the adhesive layer in adhesion even immediately after the polarizing film is taken out, particularly, from a high-humidity environment or water (even when the film is in a non-dry state). Reasons therefor are unclear. However, the improvement would be based on the following causes: While the radical polymerizable compound having an active methylene group is polymerized together with the other radical polymerizable compounds that will be included in the adhesive layer, the compound is taken into a main chain and/or side chains of a base polymer in the adhesive layer, so as to form the adhesive layer. In this polymerizing step, in the presence of the radical polymerization initiator having hydrogen-withdrawing effect, the base polymer, which will be included in the adhesive layer, is formed and simultaneously hydrogen is withdrawn from the active-methylene-having radical polymerizable compound to generate radicals in methylene groups of molecules of the compound. The methylene groups in which radicals are generated react with hydroxyl groups of the polarizer, such as ones of PVA, so that covalent bonds are formed between the adhesive layer and the polarizer. Consequently, the adhesive layer which the polarizing film has would be remarkably improved in adhesion even when the polarizing film is, particularly, in a non-dry state.

The radical polymerizable compound having an active methylene group is a compound that has, at a terminal or molecule thereof, an active double bond group such as a (meth)acryl group, and that has an active methylene group. Examples of the active methylene group include acetoacetyl, alkoxymalonyl, and cyanoacetyl groups. Specific examples of the radical polymerizable compound having an active methylene group include 2-acetoacetoxyethyl (meth)acrylate, 2-acetoacetoxypropyl (meth)acrylate, 2-acetoacetoxyethyl-1-methylethyl (meth)acrylate, and other acetoacetoxyalkyl (meth)acrylates; and 2-ethoxymalonyloxyethyl (meth) acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide.

The radical polymerization initiator having hydrogen-withdrawing effect is, for example, a thioxanthone-based radical polymerization initiator, or a benzophenone-based radical polymerization initiator. The thioxanthone-based radical polymerization initiator may be a compound represented by the following general formula (1):

[Formula 6]

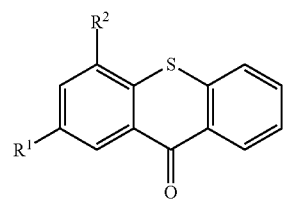

(I)

wherein $R^1$ and $R^2$ are each —H, —$CH_{2b}H_3$, -iPr or Cl, and $R^1$ and $R^2$ may be the same as or different from each other.

Specific examples of the compound represented by the general formula (1) include thioxanthone, dimethylthioxanthone, diethylthioxanthone, isopropylthioxanthone, and chlorothioxanthone. Out of compounds each represented by the general formula (1), particularly preferred is diethylthioxanthone, in which $R^1$ and $R^2$ are each —$CH_{2b}H_3$.

Besides the photopolymerization initiator of the general formula (1), the active-energy-ray-curable adhesive preferably further contains, as a photopolymerization initiator, a compound represented by the following general formula (2):

[Formula 7]

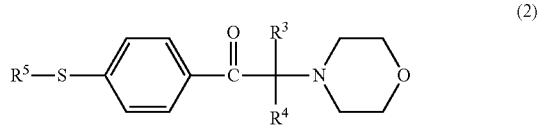

wherein $R^3$, $R^4$ and $R^5$ each represent —H, —$CH_{3b}H_{2b}H_3$, -iPr or Cl, and $R^3$, $R^4$ and $R^5$ may be the same as or different from each other. The use of the respective photopolymerization initiators represented by the general formulae (1) and (2) makes the reaction high in efficiency by photosensitizing-reaction of these initiators to improve the adhesive layer, in particular, in adhesion.

As described above, in the present invention, a radical is generated in a methylene group of the active-methylene-group-having radical polymerizable compound in the presence of the radical polymerization initiator having hydrogen-withdrawing effect. This methylene group reacts with a hydroxyl group to form a covalent bond. Thus, in order to generate radicals in the methylene groups of molecules of the active-methylene-group-having radical polymerizable compound to form covalent bonds sufficiently, the active-methylene-group-having radical polymerizable compound is incorporated into the active-energy-ray-curable adhesive into an amount preferably from 1 to 30 parts by weight, more preferably from 3 to 30 parts by weight for 100 parts by weight of the whole of the radical polymerizable compounds in the adhesive. If the amount of the active-methylene-group-having radical polymerizable compound is less than 1 part by weight, the adhesion-improving effect is low when the adhesive is in a non-dry state so that the adhesive may not be sufficiently improved in water resistance. If the amount is more than 50 parts by weight, the adhesive layer may be poorly cured. The amount of the radical polymerization initiator having hydrogen-withdrawing effect is contained in the active-energy-ray-curable adhesive in an amount preferably from 0.1 to 10 parts, more preferably from 0.3 to 9 parts by weight for 100 parts by weight of the whole of the radical polymerizable compounds in the adhesive. If the amount of the radical polymerization initiator having hydrogen-withdrawing effect is less than 0.1 parts by weight, the hydrogen-withdrawing reaction may not sufficiently advance. If the amount is more than 10 parts by weight, the initiator may not be completely dissolved in the composition.

<Optically Acid-Generating Agent>

The active-energy-ray-curable adhesive composition may contain an optically acid-generating agent. When the active-energy-ray-curable adhesive composition contains the optically acid-generating agent, the adhesive layer can be dramatically made higher in water resistance and endurance than when the composition contains no optically acid-generating agent. The optically acid-generating agent may be represented by the following general formula (3).

The general formula (3):

$L^+X^-$ wherein $L^+$ represents an onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, a dithiocarbamate anion, and SCN.

The following will describe the counter ion X in the general formula (3).

The counter ion $X^-$ in the general formula (3) is not particularly limited in principle. The ion is preferably a non-nucleophilic anion. When the counter ion $X^-$ is the non-nucleophilic anion, a nucleophilic reaction is not easily caused in a cation coexisting in the molecule of the optically acid-generating agent, or in various materials used together. Consequently, an improvement can be made in stability, over time, of the optically acid-generating agent itself, which is represented by the general formula (2), and a composition using this agent. The non-nucleophilic anion denotes an anion low in power for causing nucleophilic reaction. Examples of such an anion include $PF_6^-$, $SbF_6^-$, $AsF_6^-$, $SbCl_6^-$, $BiCl_5^-$, $SnCl_6^-$, $ClO_4^-$, a dithiocarbamate anion, and $SCN^-$.

Specific examples of the optically acid-generating agent include "CYRACURE UVI-6992", and "CYRACURE UVI-6974" (each manufactured by Dow Chemical Japan Ltd.), "ADEKAOPTOMERSP150", "ADEKA OPTOMER SP152", "ADEKA OPTOMER SP170", and "ADEKA OPTOMER SP172" (each manufactured by ADEKA CORPORATION), "IRGACURE 250" (manufactured by Ciba Specialty Chemicals Co., Ltd.), "CI-5102", and "CI-2855" (each manufactured by Nippon Soda Co., Ltd.), "SAN-A/D SI-60L", "SAN-AID SI-80L", "SAN-AID SI-100L", "SAN-AID SI-110L", and "SAN-AID SI-180L" (each manufactured by Sanshin Chemical Industry Co., Ltd.), "CPI-100P" and "CPI-100A" (each manufactured by San-Apro Ltd.), and "WPI-069", "WPI-113", "WPI-116", "WPI-041", "WPI-044", "WPI-054", "WPI-055", "WPAG-281", "WPAG-567", and "WPAG-596" (each manufactured by Wako Pure Chemical Industries, Ltd.).

The content of the optically acid-generating agent is 10% or less, preferably from 0.01 to 10%, more preferably from 0.05 to 5%, in particular preferably from 0.1 to 3% by weight of the whole of the curable resin composition.

In the active-energy-ray-curable adhesive, it is preferred to use the optically acid-generating agent together with a compound containing either an alkoxy group or an epoxy group in the active-energy-ray-curable adhesive.

(Compound and Polymer Each Having One or More Epoxy Groups)

In the case of using a compound having in the molecule thereof one or more epoxy groups, or a polymer having in the molecule thereof two or more epoxy groups (epoxy resin), it is allowable to use a compound having in the molecule thereof two or more functional groups each reactive with an epoxy group. Examples of the functional groups each reactive with an epoxy group include carboxyl, phenolic hydroxyl, mercapto, and primary or secondary aromatic amino groups. About these functional groups, the compound or the polymer in particular preferably has in one molecule thereof two or more of the groups, considering the three-dimensional curability of the adhesive.

The polymer having in the molecule one or more epoxy groups is, for example, an epoxy resin. Examples thereof include bisphenol A type epoxy resin derived from bisphenol A and epichlorohydrin, bisphenol F type epoxy resin derived from bisphenol F and epichlorohydrin, bisphenol S type epoxy resin, phenol novolak type epoxy resin, cresol novolak type epoxy resin, bisphenol A novolak type epoxy resin, bisphenol F novolak type epoxy resin, alicyclic epoxy resins, diphenyl ether type epoxy resins, hydroquinone type epoxy resins, naphthalene type epoxy resins, biphenyl type epoxy resins, fluorene type epoxy resins, polyfunctional epoxy resins such as trifunctional epoxy resins and tetrafunctional epoxy resins, glycidylester type epoxy resins, glycidylamine type epoxy resins, hydantoin type epoxy resins, isocyanurate type epoxy resins, and linear aliphatic epoxy resins. These epoxy resins may be halogenated, or hydrogenated. Examples of commercially available epoxy resin products include products JER COATS 828, 1001, 801N, 806, 807, 152, 604, 630, 871, YX8000, YX8034, and YX4000 manufactured by Japan Epoxy Resins Co., EPICHLON830, EXA835LV, HP4032D, and HP820 manufactured by DIC Corp., EP4100 series, EP4000 series, and EPU series manufactured by ADEKA CORPORATION, CELLOXIDE series (2021, 2021P, 2083, 2085, and 3000), EPOLEAD series, and EHPE series, manufactured by Daicel Corp., YD series, YDF Series, YDCN series, YDB series, phenoxy resins (for example, YP series: polyhydroxy polyethers each synthesized from a bisphenol and epichlorohydrin, and each having, at both terminals thereof, epoxy groups, respectively) manufactured by Nippon Steel Chemical Co., Ltd., DENACOL series manufactured by Nagase ChemteX Corp., and EPOLIGHT series manufactured by Kyoeisha Chemical Co., Ltd. However, the epoxy resin products are not limited to these examples. These epoxy resins may be used in combination of two or more thereof. When the glass transition temperature Tg of the adhesive layer is calculated, any compound and any polymer (H) that each have an epoxy group are not considered for the calculation.

(Compound and Polymer Each Having Alkoxyl Group)

The compound having in the molecule thereof an alkoxyl group is not particularly limited as far as the compound is a compound having in the molecule thereof one or more alkoxyl groups. The compound may be a known compound. Typical examples of such a compound include melamine compounds, and amino resins.

The blend amount of the compound having either an alkoxy group or an epoxy group is usually 30 parts or less by weight for 100 parts by weight of the whole of the radical polymerizable compounds in the active-energy-ray-curable adhesive. If the content of the compound in the composition is too large, the adhesive layer may be lowered in adhesion, and the resultant laminated polarizing film may be deteriorated, in a drop test, in impact resistance. The content of the compound in the composition is more preferably 20 parts or less by weight. In the meantime, the composition contains the compound in an amount that is preferably 2 parts or more, more preferably 5 parts or more from the viewpoint of the water resistance of the cured product layer (the adhesive layer(s) 2a).

When the active-energy-ray-curable adhesive composition (a) that can form the adhesive layer (a) is used in an electron beam form, it is not particularly necessary to incorporate any photopolymerization initiator into the composition. However, when the composition is used in an ultraviolet curable form, a photopolymerization initiator is preferably used, and a photopolymerization initiator high in sensitivity to light rays of 380 nm or more wavelengths is in particular preferably used. The photopolymerization initiator high in sensitivity to light rays of 380 nm or more wavelengths is to be detailed later.

In the active-energy-ray-curable adhesive composition (a), which can form the adhesive layer (a), it is preferred to use, as a photopolymerization initiator, the compound represented by the general formula (1) singly:

[Formula 9]

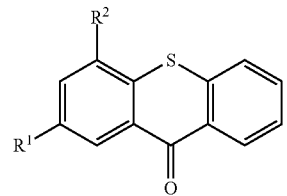

(1)

wherein $R^1$ and $R^2$ are each —H, —$CH_{2b}H_3$, -iPr or Cl, and $R^1$ and $R^2$ may be the same as or different from each other; or use the compound represented by the general formula (1) together with the photopolymerization initiator high in sensitivity to light rays of 380 nm or more wavelengths, which is to be detailed later. In the case of using the compound represented by the general formula (1), the resultant adhesive layer is better in adhesion than in the case of using singly the photopolymerization initiator high in sensitivity to light rays of 380 nm or more wavelengths. Out of compounds each represented by the general formula (1), particularly preferred is diethylthioxanthone, in which $R^1$ and $R^2$ are each —$CH_{2b}H_3$. About the composition proportion of the compound represented by the general formula (1) in the composition, the amount of the compound is preferably from 0.1 to 5.0 parts, more preferably from 0.5 to 4.0 parts, even more preferably from 0.9 to 3.0 parts by weight for 100 parts by weight of the whole of the radical polymerizable compounds in the active-energy-ray-curable adhesive.

As required, a polymerization initiation aid is preferably added to the composition. Examples of the polymerization initiation aid include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Particularly preferred is ethyl 4-dimethylaminobenzoate. When the polymerization initiation aid is used, the addition amount thereof is usually from 0 to 5 parts, preferably from 0 to 4 parts, most preferably from 0 to 3 parts by weight for 100 parts by weight of the whole of the radical polymerizable compounds.

As required, a known photopolymerization initiator may be together used. The photopolymerization initiator is preferably a photopolymerization initiator high in sensitivity to light rays of 380 nm or more wavelengths. Specific examples thereof include 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpho linyl)phenyl]-1-butanone, 2,4,6-trimethylbenzoyl-diphenyl-phosphine oxide, bis(2,4,6-trimethylbenzoyl)-phenylphosphine oxide, and bis(H5-2,4-cyclopentadiene-1-yl)-bis(2,6-difluoro-3-(1H-pyr rol-1-yl)-phenyl)titanium.

Besides the photopolymerization initiator of the general formula (1), it is preferred to use a compound represented by the following general formula (2) further:

[Formula 10]

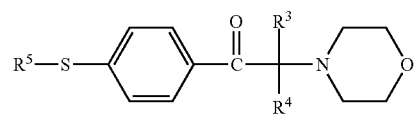

(2)

wherein $R^3$, $R^4$ and $R^5$ each represent —H, —$CH_{3b}H_{2b}H_3$, -iPr or Cl, and $R^3$, $R^4$ and $R^5$ may be the same as or different from each other. The compound represented by the general formula (2) is preferably 2-methyl-1-(4-methylthiophenyl)-2-morpholinopropane-1-one, which is also a commercially available product (trade name: IRGACURE 907, manufacturer: the company BASF). Furthermore, the following are preferred because of a high sensitivity thereof:

2-benzyl-2-dimethylamino-1-(4-morpholinophenyl)-butanone-1 (trade name: IRGACURE 369, manufacturer: the company BASF), 2-(dimethylamino)-2-[(4-methylphenyl)methyl]-1-[4-(4-morpholinyl)phenyl]-1-butanone (trade name: IRGACURE 379, manufacturer: the company BASF).

As far as the objects and the advantageous effects of the present invention are not damaged, various additives may be blended, as other optional components, into the active-energy-ray-curable adhesive composition. Examples of the additives include epoxy resins, polyamides, polyamideimides, polyurethanes, polybutadienes, polychloroprenes, polyethers, polyesters, styrene-butadiene block copolymers, petroleum resins, xylene resins, ketone resins, cellulose resins, fluorine-containing oligomers, silicone oligomers, polysulfide oligomers, and other polymers or oligomers; phenothiazine, 2,6-di-T-butyl-4-methylphenol, and other polymerization inhibitors; polymerization initiation aids; leveling agents; wettability improvers; surfactants; plasticizers; ultraviolet absorbers; inorganic fillers; pigments; and dyes.

The active-energy-ray-curable adhesive (a) is irradiated with an active energy ray to be cured, so that the adhesive layer (a) can be formed.

The active energy ray may be an electron beam, or rays including visible rays in a wavelength range from 380 to 450 nm. For reference, a long-wavelength limit of visible rays is about 780 nm. However, visible rays having a wavelength more than 450 nm do not contribute to absorption into any polymerization initiator, and further the rays may cause the generation of heat. It is therefore preferred in the present invention to use a bandpass filter to block longer-wavelength visible rays of 450 nm or more wavelengths.

Conditions for the radiation of the electron beam are arbitrary-selected appropriate conditions as far as the conditions are capable of curing the active-energy-ray-curable adhesive. For example, in the radiation of the electron beam, the accelerating voltage is preferably from 5 to 300 kV, more preferably from 10 to 250 kV. If the accelerating voltage is less than 5 kV, the electron beam may not unfavorably reach the adhesive layer so that the adhesive layer may be poorly cured. If the accelerating voltage is more than 300 kV, the penetrating power of the beam into a sample is too strong so that its polarizing film (P) and its optical film(s) (3) may be damaged. The radiated ray quantity is from 5 to 100 kGy, preferably from 10 to 75 kGy. If the radiated ray quantity is less than 5 kGy, the adhesive is insufficiently cured. If the quantity is more than 100 kGy, the polarizing film (P) and the optical film(s) (3) are damaged. Thus, the laminated polarizing film is lowered in mechanical strength and is yellowed so that this film cannot gain desired optical properties.

The electron beam is usually radiated in an inert gas. If necessary, the radiation may be performed in the atmospheric air or under a condition that a small quantity of oxygen is introduced into the gas. An appropriate introduction of oxygen dares to cause oxygen blocking in a surface of (one of) the transparent protective film(s) onto which the electron beam is initially radiated, so that the beam can be prevented from damaging the transparent protective film to radiate the electron beam effectively only to the adhesive although this matter depends on the material of the transparent protective film(s).

In order to heighten the adhesive performance of the adhesive layer (a) between the polarizing film (P) and one of the optical films (3), and simultaneously prevent the polarizing film (P) from being curled, it is preferred to use, as active energy rays, rays including visible rays in a wavelength range from 380 to 450 nm, particularly, active energy rays about which the radiation quantity of visible rays in a wavelength range from 380 to 450 nm is the largest. In the case of using a film to which ultraviolet absorbing power is given (ultraviolet impermeable film) as any one of the transparent protective films of the polarizing film (P) or any one of the optical films (3), light rays having wavelengths shorter than 380 nm that have been absorbed in the transparent protective film or the optical film (3) are converted to heat, so that heat is generated from the transparent protective film or the optical film (3). This matter causes curling, wrinkles and other defects of the laminated polarizing film. It is therefore preferred in the present invention to use, as an active energy ray generator, a device from which light rays having wavelengths shorter than 380 nm are not generated. More specifically, the ratio between the integrated illuminance of rays in a wavelength range from 380 to 440 nm to that of rays in a wavelength range from 250 to 370 nm is preferably from 100:0 to 100:50, more preferably from 100:0 to 100:40. For an active energy ray satisfying such an integrated illuminance relationship, preferred is a gallium sealed metal halide lamp or an LED light source which emits rays in a wavelength range from 380 to 440 nm. Alternatively, it is allowable to use, as a light source, a low pressure mercury lamp, a middle pressure mercury lamp, a high pressure mercury lamp, a super high pressure mercury lamp, an incandescent lamp, a xenon lamp, a halogen lamp, a carbon arc lamp, a metal halide lamp, a fluorescent lamp, a tungsten lamp, a gallium lamp, an excimer lamp, or sunlight; block, out of rays emitted therefrom, rays having wavelengths shorter than 380 nm through a bandpass filter; and use the resultant rays. In order to heighten the adhesive performance of the adhesive layer (a) between the polarizing film (P) and the optical film (3), and simultaneously prevent the polarizing film from being curled, it is preferred to use active energy rays obtained using a bandpass filter capable of blocking light rays of wavelengths shorter than 400 nm, or an active energy ray of 405 nm wavelength that is obtained using an LED light source.

About the visible-ray-curable form, it is preferred to heat the active-energy-ray-curable adhesive before the radiation of visible rays (heating before radiation). In this case, the adhesive is heated preferably to 40° C. or higher, more preferably to 50° C. or higher. It is also preferred to heat the active-energy-ray-curable adhesive after the radiation of visible rays (heating after radiation). In this case, the adhesive is heated preferably to 40° C. or higher, more preferably to 50° C. or higher.

By incorporating the photopolymerization initiator represented by the general formula (1) into the active-energy-ray-curable adhesive related to the adhesive layer (a), the adhesive layer (a) can be cured and formed when ultraviolet rays are radiated across any one of the optical films (3) that has UV absorbing power. The optical film (3) may be an optical film having a light transmittance less than 5% at a wavelength of 365 nm.

The method for giving UV absorbing power to the optical film (3) is, for example, a method of incorporating an ultraviolet absorbent into the optical film (3), or a method of laminating a surface treatment layer containing an ultraviolet absorbent onto a surface of the optical film (3).

Specific examples of the ultraviolet absorbent include oxybenzophenone-based compounds, benzotriazole-based compounds, salicylate-based compounds, benzophenone-based compounds, cyanoacrylate-based compounds, nickel complex compounds, and triazine-based compounds that are known in the prior art.

The method according to the present invention for producing a polarizing film may be a method including a first painting step of painting an adhesive composition (b) for forming an adhesive layer (b) to at least one surface of a polarizer and one out of two transparent protective films; a first bonding step of bonding the polarizer and the transparent protective film to each other; a first adhering step of causing the polarizer and the one transparent protective film to adhere to each other through the adhesive layer (b) yielded by curing the adhesive composition (b); a second painting step of painting an active-energy-ray-curable adhesive composition (a) for forming an adhesive layer (a) to at least one surface of the polarizer and the other transparent protective film; a second bonding step of bonding the polarizer and the transparent protective film to each other, and a second adhering step of radiating an active energy ray to the resultant workpiece to cure the active-energy-ray-curable adhesive composition (a) to yield the adhesive layer (a), and causing the polarizer and the other transparent protective film to adhere to each other through the yielded adhesive layer (a); or the method may be a method including a painting step of painting an active-energy-ray-curable adhesive composition (b) for forming an adhesive layer (b) to at least one surface of a polarizer and one out of two transparent protective films; another painting step of painting an active-energy-ray-curable adhesive composition (a) for forming an adhesive layer (a) to at least one surface of the polarizer and the other transparent protective film; a bonding step of bonding the polarizer to the transparent protective films; and an adhering step of radiating an active energy ray to the resultant workpiece to cure the active-energy-ray-curable adhesive compositions (a) and (b) to yield the adhesive layer (a) and the adhesive layer (b), and causing the transparent protective films to adhere to the polarizer through the yielded adhesive layer (a) and the yielded adhesive layer (b), respectively.

In the polarizing film (P), the transparent protective film (2) and the optical film (3) may be subjected to a surface modifying treatment before the painting of the active-energy-ray-curable adhesive. Specific examples of the treatment include corona treatment, plasma treatment, saponifying treatment, excimer treatment, and flame treatment.

The means for painting the active-energy-ray-curable adhesive is appropriately selected in accordance with the viscosity of the composition, and a target thickness of the resultant. Examples of the painting means include a reverse coater, a gravure coater (direct, reverse or offset), a bar reverse coater, a roll coater, a die coater, a bar coater, and a rod coater. Additionally, for the painting, a dipping manner or the like is usable.

The polarizing film (P) and the optical film (3) are bonded to each other through the adhesive painted as described above. The adhering between the polarizing film (P) and the optical film (3) can be attained, using, for example, a roll laminator.

After the bonding between the polarizing film (P) and the optical film (3), an energy ray (such as an electron beam, an ultraviolet ray, or a visible ray) is radiated onto the workpiece to cure the active-energy-ray-curable adhesive to form an adhesive layer (a). A direction along which the active energy ray (which is, for example, an electron beam, an ultraviolet ray or a visible ray) is radiated may be any appropriate radiating direction. Preferably, the active energy ray is radiated from the optical film (3) side of the workpiece. If the active energy ray is radiated from the polarizing film (P) side thereof, the polarizing film (P) may be unfavorably deteriorated by the active energy ray (which is, for example, an electron beam, an ultraviolet ray or a visible ray).

When the polarizing film according to the present invention is produced in a continuous line, the line speed, which depends on the curing period of the adhesive, is preferably from 1 to 500 m/min., more preferably from 5 to 300 m/min., even more preferably from 10 to 100 m/min. If the line speed is too small, the producing system is small in productivity, or the polarizing film (P) and the optical film (3) are excessively damaged so that a polarizing film which can endure an endurance test and others cannot be produced. If the line speed is too large, the adhesive is insufficiently cured so that the adhesive may not gain a target adhesion.

<Polarizing Film>

As described above, in the polarizing film (P), the transparent protective film (2) is laid on/over at least one surface of the polarizer (1) through the adhesive layer (b).

<Polarizer>

The polarizer is not particularly limited, and may be of various types. The polarizer is, for example, a polarizer yielded by causing a dichroic material such as iodine or dichroic dye to be adsorbed into a hydrophilic polymeric film, such as a polyvinyl alcohol-based film, a partially-formal-converted polyvinyl alcohol-based film or an ethylene/vinyl acetate copolymer-based partially saponified film, and then stretching the resultant uniaxially; or a polyene-based aligned film made of, for example, a polyvinyl alcohol dehydrated-product or a polyvinyl chloride de-hydrochloride-treated-product. Out of such polarizers, preferred is a polarizer composed of a polyvinyl alcohol film and a dichroic substance such as iodine. The thickness of such a polarizer is preferably from 2 to 30 μm, more preferably from 4 to 20 μm, most preferably from 5 to 15 μm. If the thickness of the polarizer is small, the polarizer is unfavorably lowered in optical endurance. If the thickness of the polarizer is large, the polarizer is largely changed in dimension at a high temperature and high humidity so that the resultant display device causes inconveniences such as display unevenness.

The polarizer in which a polyvinyl alcohol-based film dyed with iodine has uniaxially stretched can be produced, for example, by immersing a polyvinyl alcohol into an aqueous solution of iodine to be dyed, and then stretching the resultant film into a length 3 to 7 times the original length of this film. As required, the stretched film may be immersed into an aqueous solution of, for example, boric acid or potassium iodide. Furthermore, before the dyeing, the polyvinyl alcohol-based film may be immersed into water as required to be cleaned with water. The cleaning of the polyvinyl alcohol-based film with water allows to clean stains and a blocking-preventing agent on surfaces of the polyvinyl alcohol-based film, and further produce an advantageous effect of swelling the polyvinyl alcohol-based film to prevent unevenness of the dyeing, and other unevennesses. The stretching may be performed after the dyeing with iodine or while the dyeing is performed. Alternatively, after the stretching, the dyeing with iodine may be performed. The stretching may be performed in an aqueous solution of, for example, boric acid or potassium iodide, or in a water bath.

When a thin polarizer having a thickness of 10 μm or less is used as the polarizer, the active-energy-ray-curable adhesive composition used in the present invention can remarkably produce the advantageous effect thereof (that the resultant adhesive layer satisfies optical endurance in a severe environment at a high temperature and high humidity). The polarizer, the thickens of which is 10 μm or less, is more largely affected by water than any polarizer having a thickness more than 10 μm, so that the former is insufficient in optical endurance in an environment at a high temperature and high humidity to be easily raised in transmittance or lowered in polarization degree. Accordingly, in the case of laminating the polarizer, the thickness of which is 10 μm or less, onto a transparent protective film though an adhesive layer having a bulk water absorption of 10% or less by weight in the invention, the shift of water into the polarizer is restrained in a severely high temperature and high humidity environment. Consequently, the polarizing film can be remarkably restrained from undergoing deteriorations in optical endurances, such as a rise in transmittance and a lowering in polarization degree. The thickness of the polarizer is preferably from 1 to 7 μm from the viewpoint of making the polarizer thinner. Such a thin polarizer is small in thickness unevenness, excellent in perceptibility, and small in dimension change. Furthermore, favorably, this thin polarizer also makes the resultant polarizing film small in thickness.

Typical examples of the thin polarizer include thin polarizing membranes described in JP-A-S51-069644, JP-A-2000-338329, WO 2010/100917 pamphlet, and specifications of PCT/JP2010/001460 and Japanese Patent Applications No. 2010-269002 and No. 2010-263692. These thin polarizing membranes can each be yielded by a producing method including the step of stretching a polyvinyl alcohol-based resin (hereinafter referred to also as a PVA-based resin) and a resin substrate for stretching in a laminate state, and the step of dyeing the laminate. This producing method allows to stretch the laminate, even when the PVA-based resin layer is thin, without causing any inconvenience, such as breaking by the stretching, on the basis of the supporting of the PVA-based resin layer on the resin substrate for stretching.

The thin polarizing membranes are preferably polarizing membranes each yielded by the following producing method, out of producing methods including the step of stretching a PVA-based resin and a substrate in a laminate state and the step of dyeing the stretched laminate, since the laminate can be stretched into a large stretch ratio to improve the resultant in polarizing performance: a producing method including the step of drawing the laminate in an aqueous solution of boric acid, as is described in a pamphlet of WO 2010/100917, PCT/JP 2010/001460, or Japanese Patent Application No. 2010-269002 or 2010-263692 specification. The membranes are in particular preferably membranes each yielded by a producing method including the step of drawing the laminate supplementally in the air before the drawing in the aqueous solution of boric acid, as is described in Japanese Patent Application No. 2010-269002 or 2010-263692 specification.

<Transparent Protective Film>

The material which forms the transparent protective film (2) is preferably a thermoplastic resin excellent in transparency, mechanical strength, thermal stability, water blocking performance, isotropy and others. Examples of the thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic polyolefin resins (norbornene-based resins), polyarylate resins, polystyrene resins, and polyvinyl alcohol resins; and mixtures of two or more of these resins. The transparent protective film may contain one or more additives selected appropriately at will. Examples of the additive(s) include an ultraviolet absorbent, an antioxidant, a lubricant, a plasticizer, a release agent, a coloring preventive, a flame retardant, a nucleating agent, an antistatic agent, a pigment and a colorant. The content of the above-mentioned thermoplastic resin in the transparent protective film is preferably from 50 to 100%, more preferably from 50 to 99%, even more preferably from 60 to 98%, in particular preferably from 70 to 97% by weight. If the content of the thermoplastic resin in the transparent protective film is 50% or less by weight, it is feared that the transparent protective film cannot sufficiently express high transparency and other properties which the thermoplastic resin originally has.

The material which forms the transparent protective film (2) is preferably a material excellent in transparency, mechanical strength, heat stability, water blocking performance, isotropy, and others. The humidity permeability of the material is more preferably 150 g/m$^2$/24-hours or less, in particular preferably 140 g/m$^2$/24-hours or less, more preferably 120 g/m$^2$/24-hours or less. In particular, the humidity permeability is gained by a method described in the item EXAMPLES.

In the case of using a transparent protective film having a humidity permeability of 150 g/m$^2$/24-hours or less in the polarizing film, water in the air does not easily enter the inside of the polarizing film, so that the water content by percentage in the polarizing film itself can be restrained from being changed. As a result, the polarizing film can be restrained from being curled or changed in dimension by a storage environment of the film.

A functional layer may be laid onto the surface of the transparent protective film (2) onto which the polarizer (1) is not bonded, this layer being, for example, a hard coat layer, an anti-reflection layer, a sticking-preventing layer, a diffusion layer or an anti-glare layer. The functional layer, which may be a hard coat layer, an anti-reflection layer, a sticking-preventing layer, a diffusion layer or an anti-glare layer, may be fitted to the transparent protective film (2) itself, or may be separately disposed in the form of a member separated from the transparent protective film (2).

The thickness of the transparent protective film (2) may be appropriately determined, and is generally from about 1 to 500 μm, preferably from 1 to 300 μm, more preferably from 5 to 200 μm from the viewpoint of, for example, the strength, the handleability and other workabilities, and the thinness of the film. Furthermore, the thickness is preferably from 10 to 200 μm, preferably from 20 to 80 μm.

The transparent protective films (2) that are laid, respectively, on both surfaces of the polarizer (1) may be transparent protective films made of the same material on the front and rear surfaces of the polarizer, or may be transparent protective films made of, for example, polymeric materials different from each other.

The transparent protective film may be a retardation film having a front retardation of 40 nm or more and/or having a thickness-direction retardation of 80 nm or more. Usually, the front retardation and the thickness-direction retardation are controlled into the range of 40 to 200 nm, and that of 80 to 300 nm, respectively. When a retardation film is used as the transparent protective film, this retardation film functions also as a transparent protective film, so that the laminated polarizing film can be made thin.

The retardation film may be, for example, a birefringence film yielded by stretching a polymeric material uniaxially or biaxially, an aligned film of a liquid crystal polymer, or a product in which an aligned layer of a liquid crystal polymer is supported on a film. The thickness of the retardation film is not particularly limited, and is generally from about 20 to 150 μm.

The retardation film may be a reverse wavelength dispersion type retardation film satisfying the following expressions (1) to (3):

$$0.70 < Re[450]/Re[550] < 0.97 \quad (1),$$

$$1.5 \times 10^{-3} < \Delta n < 6 \times 10^{-3} \quad (2), \text{ and}$$

$$1.13 < NZ < 1.50 \quad (3)$$

wherein Re[450] and Re[550] are, respectively, an in-plane retardation value of the retardation film that is measured at a wavelength of 450 nm at 23° C., and an in-plane retardation value of the retardation film that is measured at a wavelength of 550 nm at 23° C.; Δn is an in-plane birefringence "nx-ny" of the retardation film when the retardation film has a refractive index nx in a slow axis direction of the film, and has a refractive index ny in a fast axis direction of the film; and when the retardation film has a refractive index nz in a thickness direction of the film, NZ is a ratio between "nx-nz", which is a birefringence of the film in the thickness direction, and "nx-ny", which is an in-plane birefringence of the film.

In the laminated polarizing film in each of FIGS. 1A, 1B, and 2 to 4, a retardation film is usable as the transparent protective film (2) or each of the transparent protective films (2). About the transparent protective films (2) on both sides of the polarizer (1), a film on one of the sides may be a retardation film, or the two films on both the sides may be retardation films. In particular, in each of FIGS. 3 and 4, the transparent protective film on the adhesive layer (b2) side of the laminated polarizing film is preferably a retardation film. In particular, in the case of using, as the transparent protective films (2) on both the sides, retardation films, the embodiment in FIG. 4 is preferably adopted.

<Adhesive Layer (b)>

The adhesive layer (b) is not particularly limited as far as the layer is optically transparent. The layer may be a layer in any one of various forms, such as water-based, solvent-based, hot melt-based, and active-energy-ray-curable forms. As described above, the adhesive layer (b) is preferably a layer having a predetermined thickness and satisfying a predetermined storage modulus.

Examples of the water-based curable adhesive include vinyl polymer-based, gelatin-based, vinyl latex-based, polyurethane-based, isocyanate-based, polyester-based and epoxy-based adhesives. An adhesive layer made of such a water-based adhesive may be formed as, for example, a painted and dried layer of an aqueous solution. When the aqueous solution is prepared, a crosslinking agent, other additives, and a catalyst such as an acid may be blended into the solution as required.

The water-based curable adhesive may be, for example, an adhesive containing a vinyl polymer. The vinyl polymer is preferably polyvinyl alcohol-based resin. The polyvinyl alcohol-based resin is preferably an adhesive containing a polyvinyl alcohol-based resin having an acetoacetyl group from the viewpoint of an improvement of the adhesive in endurance. The crosslinking agent which can be blended into the polyvinyl alcohol-based resin is preferably a compound having at least two functional groups reactive with the polyvinyl alcohol-based resin. Examples of the crosslinking agent include boric acid, borax, carboxylic acid compounds, and alkyldiamines; isocyanates; epoxy compounds; monoaldehydes; dialdehydes; amino-formaldehyde resins; and salts of any divalent metal or trivalent metal, and oxides thereof. A water-soluble silicate may be blended into the polyvinyl alcohol-based resin. Examples of the water-soluble silicate include lithium silicate, sodium silicate, and potassium silicate.

The active-energy-ray-curable adhesive may be an adhesive in anyone of various forms. Examples thereof include electron-beam curable adhesives, ultraviolet-curable adhesives, and other active-energy-ray-curable adhesives. The ultraviolet-curable adhesives can be roughly classified into radical polymerization curable adhesives, and cationic polymerization curable adhesives. The radical polymerization curable adhesives may be used as thermosetting resins. As an active-energy-ray-curable adhesive used to form the adhesive layer (b), an active-energy-ray-curable adhesive used to form the adhesive layer (a) is usable.

The adhesive layer (b1) as the adhesive layer (b) is preferably a polyvinyl alcohol adhesive. The adhesive layer (b2) as the adhesive layer (b) is preferably an active-energy-ray-curable adhesive.

The adhesive which forms the adhesive layer (a) or the adhesive layer (b) may appropriately contain an additive if necessary. Examples of the additive include a silane coupling agent, a titanium coupling agents and other coupling agents, adhesion promoters, a typical example thereof being ethylene oxide, additives for improving the adhesive layer in wettability with the transparent film, additives for improving the laminated polarizing film in mechanical strength, workability and others, typical examples thereof including acryloxy group compounds, and hydrocarbon compounds (natural or synthetic resins), ultraviolet absorbers, antiaging agents, dyes, processing aids, ion trapping agents, antioxidants, tackifiers, fillers (other than metal compound filler), plasticizer, leveling agent, antifoaming agent, antistatic agents, and stabilizers such as heat resistant stabilizer and hydrolysis resistant stabilizer.

In the laminated polarizing film of the present invention, the polarizing film (P) and the optical film (3) are bonded to each other through the adhesive layer (a). One or more easily adhesive layers may be laid onto the transparent protective film (2) and/or the optical film (3). Moreover, in the polarizing film (P), one or more easily adhesive layers may be laid onto the polarizer (1) and/or the transparent protective film (2).

The easily adhesive layer or each of the easily adhesive layers may be formed, using a resin that may be of various types, examples of the resin including resins each having a polyester skeleton, a polyether skeleton, a polycarbonate skeleton, a polyurethane skeleton, a silicone-based, a polyamide skeleton, a polyimide skeleton, or a polyvinyl alcohol skeleton. These polymer resins may be used alone or in combination of two or more thereof. In the formation of the easily adhesive layer, a different additive may be added to the layer. Specifically, a tackifier, an ultraviolet absorber, an antioxidant, or a stabilizer such as a heat stabilizer may be used. The thickness of the easily adhesive layer is preferably from 0.01 to 5 μm, more preferably from 0.02 to 2 μm, even more preferably from 0.05 to 1 μm after the layer is dried.

Plural easily adhesive layers may be laid. Also in this case, the total thickness of the easily adhesive layers is preferably set into any one of these ranges.

<Optical Film>

The optical film (3) may be an optical layer that is other than the polarizer (1) and that may be used to form, for example, a liquid crystal display device, such as a retardation film (examples thereof including ½ and ¼ wavelength plates), a viewing angle compensation films, a brightness enhancement film, a reflector or a trans reflector.

Optical films (3) that are two or more layers may be used. When these optical films, which are two or more layers, are used, the same adhesive layer (a) as described above may be used also to laminate the second optical film. The optical film (s) (3) is/are (each) preferably a retardation film.

In the same manner as described above, the retardation film may be a retardation film having a front retardation of 40 nm or more and/or having a thickness-direction retardation of 80 nm or more. Usually, the front retardation and the thickness-direction retardation are controlled into the range of 40 to 200 nm, and that of 80 to 300 nm, respectively.

Examples of the retardation film include a birefringent film yielded by stretching a polymeric material uniaxially or biaxially, an aligned film of a liquid crystal polymer, and a film in which an aligned layer of a liquid crystal polymer is supported on a film. The thickness of the retardation is not particularly limited, and is generally about from 20 to 150 μm.

The retardation film may be a reverse wavelength dispersion type retardation film satisfying the following expressions (1) to (3):

$$0.70 < Re[450]/Re[550] < 0.97 \quad (1),$$

$$1.5 \times 10^{-3} < \Delta n < 6 \times 10^{-3} \quad (2), \text{ and}$$

$$1.13 < NZ < 1.50 \quad (3)$$

wherein Re[450] and Re[550] are, respectively, an in-plane retardation value of the retardation film that is measured at a wavelength of 450 nm at 23° C., and an in-plane retardation value of the retardation film that is measured at a wavelength of 550 nm at 23° C.; Δn is an in-plane birefringence "nx-ny" of the retardation film when the retardation film has a refractive index nx in a slow axis direction of the film, and has a refractive index ny in a fast axis direction of the film; and when the retardation film has a refractive index nz in a thickness direction of the film, NZ is a ratio between "nx-nz", which is a birefringence of the film in the thickness direction, and "nx-ny", which is an in-plane birefringence of the film.

In the laminated polarizing film of the present invention, a pressure-sensitive adhesive layer may be laid for adhering this polarizing film onto a different member such as a liquid crystal cell. A pressure-sensitive adhesive agent which forms the pressure-sensitive adhesive layer is not particularly limited. This agent may be appropriately selected from the following to be used: pressure-sensitive adhesive agents each containing, as a base polymer thereof, acrylic polymer, silicone-based polymer, polyester, polyurethane, polyamide, polyether, fluorine-containing polymer, rubbery polymer, or some other polymers. The pressure-sensitive adhesive agent is in particular preferably an acrylic pressure-sensitive adhesive, or any other pressure-sensitive adhesive that is excellent in optical transparency, and shows adherabilities of appropriate wettability, cohesive property and adhesion to be excellent in weather resistance, heat resistance and others.

Pressure-sensitive adhesive layers different from each other in composition or species may be laid, as superimposed layers, onto a single surface or each surface of the laminated polarizing film or the laminated optical film. When pressure-sensitive adhesive layers are laid, respectively, onto both surfaces of the film, these layers may be different from each other in, for example, composition, species or thickness on the front and rear side of the film. The thickness of (each of) the pressure-sensitive adhesive layer(s) may be appropriately decided in accordance with, for example, the use purpose and adhering strength thereof. The thickness is generally from 1 to 500 μm, preferably from 1 to 200 μm, in particular preferably from 1 to 100 μm.

A separator is temporarily bonded to a naked surface of the pressure-sensitive adhesive layer to cover the surface in order to attain the prevention of the pollution of the surface, and other purposes until the polarizing film is put into practical use. This coverage allows to prevent an object or a person from contacting the pressure-sensitive adhesive layer in the state that the polarizing film is ordinarily handled. The separator may be an appropriate separator according to conventional techniques except the above-mentioned thickness conditions. The separator may be an appropriate flat piece yielded according to the prior art, such as a plastic film, a rubber sheet, a paper, cloth or nonwoven cloth piece, a net, a foamed sheet or a metal foil piece; a laminated body of such flat pieces; or a product in which such a flat piece is optionally subjected to coating treatment with an appropriate release agent, such as a silicone type, long-chain alkyl type or fluorine-containing type agent, or molybdenum sulfide.

The laminated polarizing film or laminated optical film of the present invention is preferably usable to form various devices such as a liquid crystal display device. The formation of the liquid crystal display device may be attained in accordance with the prior art. In other words, any liquid crystal display device is generally formed by fabricating appropriately a liquid crystal cell, a laminated polarizing film or laminated optical film, an optional lighting system, and other constituent parts, and then integrating a driving circuit into the resultant. In the present invention, a method for forming a liquid crystal display device is not particularly limited as far as the laminated polarizing film or laminated optical film according to the invention is used. The method is substantially according to the prior art. A liquid crystal cell therefor may be also of any type, such as a TN type, STN type or π type.

An appropriate liquid crystal display device may be formed, examples of the device including a liquid crystal display device in which a laminated polarizing film or laminated optical film is arranged onto a single side or each of two sides of a liquid crystal cell, and a liquid crystal display device in which a backlight or reflector is used as a lighting system. In this case, the laminated polarizing film or laminated optical film according to the present invention can be set on the single side or each of the two sides of the liquid crystal cell. When laminated polarizing films or laminated optical films of the invention are set up, respectively, on the two sides, these may be the same as or different from each other. When the liquid crystal display device is formed, one or more appropriate components may be further arranged, at one or more appropriate positions of the device, in the form of one or two or more layers. Examples of the component (s) include a diffusion plate, an anti-glare layer, an anti-reflection film, a protective plate, a prism array, a lens array sheet, a light diffusion plate, and a backlight.

EXAMPLES

Hereinafter, working examples of the present invention will be described. However, embodiments of the invention are not limited to these examples.
<Measurement of Glass Transition Temperature>

About any adhesive layer or any pressure-sensitive-adhesive layer used in each of the working examples and comparative examples, the glass transition temperature thereof is gained by the following method:
[Method for Measuring Glass Transition Temperature (Tg)]

The glass transition temperature is measured, using a viscoelastic spectrometer (trade name: RSA-II) manufactured by Rheometrics, Inc. Conditions for the measurement are as follows: frequency: 1 Hz, sample thickness: 2 mm, compressive load: 100 g, and temperature-raising rate: 5° C./min. In a range from −50 to 200° C., a temperature-dependent spectrum of the tan δ of the layer is measured. A peak temperature thereof is used as a measured value.
<Transparent Protective Films>

Each transparent protective film (3a): corona treatment was applied to each reverse wavelength dispersion type retardation film having a thickness of 55 μm. The resultant was used. The reverse wavelength dispersion type retardation film satisfied the following expressions (1) to (3):

$$0.70<Re[450]/Re[550]<0.97 \quad (1),$$

$$1.5\times10^{-3}<\Delta n<6\times10^{-3} \quad (2), \text{ and}$$

$$1.13<NZ<1.50 \quad (3)$$

wherein Re[450] and Re[550] are, respectively, an in-plane retardation value of the retardation film that is measured at a wavelength of 450 nm at 23° C., and an in-plane retardation value of the retardation film that is measured at a wavelength of 550 nm at 23° C.; Δn is an in-plane birefringence "nx-ny" of the retardation film when the retardation film has a refractive index nx in a slow axis direction of the film, and has a refractive index ny in a fast axis direction of the film; and when the retardation film has a refractive index nz in a thickness direction of the film, NZ is a ratio between "nx-nz", which is a birefringence of the film in the thickness direction, and "nx-ny", which is an in-plane birefringence of the film.

Each transparent protective film (3b): corona treatment was applied to a (meth)acrylic resin having a thickness of 50 μm having a lactone ring structure. The resultant was used.
<Each Optical Film (3c) Other Than Polarizers>

Corona treatment was applied to a liquid crystal aligned layer side of each liquid crystal retardation film (film in which a liquid crystal aligned layer of 4 μm thickness was carried on a polyethylene terephthalate film of 38 μm thickness). The resultant was used.
<Polyvinyl Alcohol-Based Adhesive>

To 100 parts of a PVA-based resin containing acetoacetyl (AA) groups (average polymerization degree: 1200, saponification degree: 98.5% by mole, and AA-group modified degree: 5% by mole (the resin is referred to as AA-modified PVA in Table 1) were added 20 parts of methylolmelamine, and the resultant was dissolved into pure water at a temperature of 30° C. to prepare an aqueous solution having a solid concentration adjusted to 0.5%. This was used as an adhesive at a temperature of 30° C.
<Production of Each Polarizing Film>

In order to produce each polarizing film, a laminate in which a PVA film of 9 μm thickness was formed on an amorphous PET substrate was initially subjected to in-air auxiliary stretching at a stretching temperature of 130° C. to produce a stretched laminate. Next, the stretched laminate was dyed to produce a colored laminate. Furthermore, the colored laminate was subjected to stretching in boric-acid water at a stretching temperature of 65° C. to give a total stretch ratio of 5.94. In this way, each optical film laminate was produced which included a PVA layer of 4 μm thickness that was stretched together with the amorphous PET substrate. This two-stage stretching succeeded in the production of the optical film laminate including the PVA layer of 5 μm thickness, this laminate constituting a highly functional polarizing film in which PVA molecules of the PVA layer formed on the amorphous PET substrate were highly aligned and iodine adsorbed by the dyeing was highly aligned in one direction in the form of a polyiodine ion complex.

While the above-mentioned polyvinyl alcohol based adhesive was painted onto a surface of the polarizing film of each of the above-mentioned optical film laminates, one of the above-mentioned transparent protective films (3b) was bonded onto the surface. Thereafter, the workpiece was dried at 50° C. for 5 minutes to yield each polarizing film. The thickness of an adhesive layer (b) formed on the transparent protective film (3b) was 1 μm. The adhesive layer had a glass transition temperature of 85° C., had a storage modulus of 1.5×109 Pa at 25° C., and had a storage modulus of 1.0×108 Pa at 85° C.
<Active Energy Ray>

For active energy rays, an ultraviolet ray (gallium sealed metal halide lamp) radiating device Light HAMMER 10 manufactured by Fusion UV Systems, Inc. is used. Bulb: V bulb; peak illuminance: 1600 mW/cm$^2$; and integrated radiation quantity: 1000/mJ/cm$^2$ (at wavelengths of 380 to 440 nm). The illuminance of ultraviolet rays is measured, using a Sola-Check system manufactured by Solatell Ltd.
<Measurement of Viscosity>

The viscosity (cp/25° C.) of any active-energy-ray-curable adhesive composition or any pressure-sensitive adhesive used in each of the working examples and the comparative examples is a value measured by an E-type rotary viscometer. The measurement values are shown in Tables 1 to 3.

Examples 1 to 15, and Comparative Examples 1 to 6
(Preparation of Active-Energy-Ray-Curable Adhesive Related to Adhesive Layer (a))

In each of the examples, in accordance with one of blend tables described as Tables 1 to 3, individual components were blended with each other, and the blend was stirred at 50° C. for one hour to yield an active-energy-ray-curable adhesive. In each of the tables, numerical values about the active-energy-ray-curable adhesive show, respectively, parts by weight of the individual components when the total amount of the radical polymerizable compounds in this adhesive was regarded as 100 parts by weight.
(Production of Each Laminated Polarizing Film)

Examples 1 to 1 to 5, Examples 7 to 15, and Comparative Examples 1 to 6

In each of the working examples and the comparative examples, from each of some of the above-mentioned polarizing films, its amorphous PET substrate was peeled off and then corona treatment was applied to the polarizer surface thereof. Using an MCD coater (manufactured by Fuji Machinery Co., Ltd.) (cell shape: honeycomb, the number of gravure roll lines: 1000/inch, and rotating speed: 140% of line speed), the corona surface was coated with an active-energy-ray-curable adhesive composition which was capable of forming the adhesive layer (a) according to the example and which is shown in Table 1, so as to give a thickness shown in one of Tables 1 to 3.

The adhesive applied surface of each of these polarizing films was bonded onto the corona-treated surface side of any one of the transparent protective films (3a). Thereafter, the above-mentioned ultraviolet rays were radiated to the workpiece to cure the active-energy-ray-curable adhesive composition related to the adhesive layer (a). In this way, each polarizing film (P1) was yielded in each of the examples.

Corona treatment was applied to the transparent protective film (3a) side surface of each of the polarizing films P1) yielded as described above, and then the surface was coated with the active-energy-ray-curable adhesive related to the adhesive layer (a) in Example 1. This polarizing film was bonded onto the corona-treated surface of any one of the liquid crystal type retardation films. In this way, each laminated polarizing film was produced. The thickness of the adhesive layer (a) formed on the liquid crystal type retardation film (3c) was 1 µm.

Example 6

Each laminated polarizing film was produced in the same way as in Example 1 and the other examples except that the adhesive layer (a) for causing the polarizing film (P1) and the liquid crystal type retardation film (3c) to adhere to each other was changed to the adhesive layer (a) in Example 6.

Evaluations described below were made about the active-energy-ray-curable adhesive, and the laminated polarizing films yielded in each of the examples. The results are shown in Table 1 to 3.

<Interlayer Adhering Strength>

The polyethylene terephthalate film on the liquid crystal type retardation film side of one of the laminated polarizing films was peeled off, and a polybutyl acrylate based pressure-sensitive adhesive (thickness: 23 µm) was bonded onto the film-peeled surface. Furthermore, the resultant was cut into a size of 200 mm in parallel with the stretched direction of the polarizer and 15 mm in a direction orthogonal thereto. A utility knife was used to make a cut into between the polarizer and the transparent protective film (3a), and then the release film of the polybutyl acrylate based pressure-sensitive adhesive was peeled off. The pressure-sensitive adhesive surface was bonded to a glass plate. A machine Tensilon was used to peel the polarizing film and the retardation film from each other into 120-degree directions at a peel rate of 10000 mm/min. The peel strength (N/15-mm) thereof was measured.

<Interlayer Adhering Strength After Immersion of Film in Water>

The polyethylene terephthalate film on the liquid crystal type retardation film side of one of the laminated polarizing films was peeled off, and a polybutyl acrylate based pressure-sensitive adhesive (thickness: 23 µm) was bonded onto the film-peeled surface. Furthermore, the resultant was cut into a size of 200 mm in parallel with the stretched direction of the polarizer and 15 mm in a direction orthogonal thereto. A utility knife was used to make a cut into between the polarizing film and the retardation film, and then the release film of the polybutyl acrylate based pressure-sensitive adhesive was peeled off. The pressure-sensitive adhesive surface was bonded to a glass plate. Thereafter, the glass plate was immersed in water of 25° C. temperature for 3 hours, and then taken out. Extra water was removed therefrom, and then a machine Tensilon was used to peel the polarizing film and the retardation film from each other into 120-degree directions at a peel rate of 10000 mm/min. The peel strength (N/15-mm) thereof was measured.

<Interlayer Adhering Strength After Putting of Film in Humidifying Environment>

The polyethylene terephthalate film on the liquid crystal type retardation film side of one of the laminated polarizing films was peeled off, and a polybutyl acrylate based pressure-sensitive adhesive (thickness: 23 µm) was bonded onto the film-peeled surface. Furthermore, the resultant was cut into a size of 200 mm in parallel with the stretched direction of the polarizer and 15 mm in a direction orthogonal thereto. A utility knife was used to make a cut into between the polarizing film and the retardation film, and then the release film of the polybutyl acrylate based pressure-sensitive adhesive was peeled off. The pressure-sensitive adhesive surface was bonded to a glass plate. Thereafter, the glass plate was put in an environment of 20° C. temperature and 98% relative humidity for 24 hours, and then taken out. A machine Tensilon was then used to peel the polarizing film and the retardation film from each other into 120-degree directions at a peel rate of 10000 mm/min. The peel strength (N/15-mm) thereof was measured.

<Adhesion Endurance>

The polyethylene terephthalate film on the liquid crystal type retardation film side of one of the laminated polarizing films was peeled off, and a polybutyl acrylate based pressure-sensitive adhesive (thickness: 23 µm) was bonded onto the film-peeled surface. Furthermore, the resultant was cut into a size of 300 mm in parallel with the stretched direction of the polarizer and 200 mm in a direction orthogonal thereto. The release film of the polybutyl acrylate based pressure-sensitive adhesive was peeled off. The pressure-sensitive adhesive surface was bonded to a glass plate. This sample was pressurized in an environment of 50° C. and 5 atm. for 15 minutes, and put in an environment of 85° C. for 250 hours. Thereafter, in any end of the polarizing film, the peel distance of the film was measured. When no peel was generated, the sample was judged to be good (circular mark); when a peel was generated in the range of a distance of 2 mm or less from the end, the sample was judged to be fair (triangular mark); or when a peel giving a peel distance more than 2 mm was generated, the sample was judged to be bad (cross mark).

<Liquid Storability (Pot Life) of Adhesive>

The adhesive liquid was put into a glass bottle of 250 mL volume, and the bottle was allowed to stand still in an opening system in an environment of 25° C. temperature and 50% relative humidity while the liquid was stirred with a magnetic stirrer. Thereafter, it was visually evaluated whether or not the adhesive liquid underwent phase separation to become clouded. When the sample was transparent without becoming clouded over a stirring period of 24 hours, the sample was judged to be good; the sample was transparent without becoming clouded over a stirring period of 12 hours but became clouded in a stirring period of 24 hours, the sample was judged to be fair; or when the sample became clouded in a stirring period of 12 hours, the sample was judged to be bad.

<Impact Resistance>

A pressure-sensitive-adhesive layer was laminated onto the retardation film surface of one of the laminated polarizing films. The resultant was cut into a rectangle of a size of 50 mm in the stretched direction of the polarizer and 100 mm in a direction perpendicular thereto. This laminated polarizing film was laminated onto a glass plate having a thickness of 0.5 mm, a length of 120 mm, and a width of 60 mm to produce a sample. In order to prevent the glass plate from being broken, a cellophane tape had been bonded to the whole of the rear surface of the glass plate.

The sample was put in an environment of 20° C. temperature and 98% relative humidity for 24 hours, and then taken out. The sample was then naturally dropped from a height of 1 m. The drop was repeated 100 times. A peel state of any end of the polarizing film was then visually observed.

◯: no peel was observed.

Δ: the distance of a peel from the end was less than 1 mm.

x: the distance of a peel from the end was 1 mm or more.

<Crack Resistance (Heat Shock Test)>

The polyethylene terephthalate film on the liquid crystal type retardation film side of one of the laminated polarizing films was peeled off, and a polybutyl acrylate based pressure-sensitive adhesive (thickness: 23 μm) was bonded onto the film-peeled surface. Furthermore, the resultant was cut into a rectangle having a size of 200 mm in parallel with the stretched direction of the polarizer and 400 mm in a direction orthogonal thereto. Through the pressure-sensitive adhesive layer, the polarizing film was laminated onto a glass plate. The resultant was subjected to a heat cycle test of repeating a cycle of −40° C.↔85° C. After 50 cycles, the polarizing film was visually observed. This sample was evaluated in accordance with the following criterion:

◯: the generation of crack was not observed.

Δ: in the polarizer, a crack was generated which did not penetrate the polarizer in the stretched direction thereof (crack length: 200 mm or less).

x: in the polarizer, a crack was generated which penetrated the polarizer in the stretched direction thereof (crack length: 200 mm).

<Heating Buckling Resistance>

A pressure-sensitive-adhesive layer was laminated onto the retardation film surface of one of the laminated polarizing films. The resultant was cut into a rectangle of a size of 200 mm in the stretched direction of the polarizer and 400 mm in a direction perpendicular thereto. Through the pressure-sensitive-adhesive layer, the laminated polarizing film was laminated onto each of both surfaces of a liquid crystal cell (taken from "32-inch liquid crystal television BRAVIA (registered trade mark) KDL-32F1" manufactured by Sony Corp.) into a crossed Nichol state to produce a liquid crystal panel. About this liquid crystal panel, the following tests were made:

1: heating test (at 85° C. for 12 hours), and

2: heat cycle test of repeating a cycle of −40° C.↔85° C.; 100 cycles.

After the tests, the liquid crystal panel was visually observed, and streak unevenness therein was evaluated in the following criterion:

◯: the generation of streak unevenness was not observed.

Δ: the generation of slight streak unevenness was observed in only an end of the panel.

x: streak unevenness was generated.

TABLE 1

| | | | | Example 1 | Example 2 | Example 3 | Example 4 |
|---|---|---|---|---|---|---|---|
| Active-energy-ray-curable adhesive composition (parts by weight) | Radical polymerizable compounds | Alkyl (meth)acrylates (A) having 10 to 20 carbon atoms | ISTA (A2) | 31.1 | 27.8 | 46.1 | 57.7 |
| | | | LIGHT ACRYLATE L-A (A1) | 7.7 | 18.4 | 11.9 | 13.8 |
| | | Nitrogen-containing monomers (B) | HEAA | — | — | — | — |
| | | | ACMO | 23.1 | 36.2 | 30.8 | 17.3 |
| | | Radical polymerizable compounds having hydroxyl group | 4HBA | — | — | — | — |
| | | | PLACCEL FA1DDM | 23.1 | 4.1 | 3.5 | 3.5 |
| | | | Methacrylamidephenylboric acid | — | — | — | — |
| | | Polyfunctional radical polymerizable compounds | TPGDA | — | — | — | — |
| | | | LIGHT ACRYLATE 9EG-A | — | — | — | — |
| | | | LIGHT ACRYLATE 1,9NDA | 15.0 | 13.5 | 7.7 | 7.7 |
| | | Radical polymerizable compound having active methylene group | AAEM | — | — | — | — |
| | | Alkyl (meth)acrylates having 2 to 9 carbon atoms | BA | — | — | — | — |
| | | | 2EHA | — | — | — | — |
| | | Acrylic oligomer | UP-1190 | 15.3 | 35.1 | 15.3 | 15.3 |
| | | Radical polymerization initiator having hydrogen-withdrawing effect | KAYACURE DETX-S | 3.5 | 4.1 | 3.5 | 3.5 |
| | | Photopolymerization initiator | IRGACURE 907 | 3.5 | 4.1 | 3.5 | 3.5 |
| | | Crosslinking agent | CORONATE L | — | — | — | — |
| | | Viscosity (cp/25° C.) | | 23 | 27 | 19 | 19 |
| Adhesive layer (a) or pressure-sensitive adhesive layer Evaluations | | Glass transition temperature (° C.) | | 14 | 14 | 16 | 2 |
| | | (A1/A2) | | 2.0/8.0 | 4.0/6.0 | 2.0/8.0 | 1.9/8.1 |
| | | Thickness (μm) | | 1.0 | 0.7 | 1.0 | 0.9 |
| | | Adhering strength (N/15-mm) between polarizer and liquid crystal type retardation film | At ordinary time | 0.8 | 0.8 | 0.8 | 0.8 |
| | | | After film-immersion in water of 25° C. temperature | 0.7 | 0.7 | 0.8 | 0.8 |
| | | | After humidification of film | 0.7 | 0.7 | 0.7 | 0.7 |
| | | Impact resistance after humidification | | ◯ | ◯ | ◯ | ◯ |
| | | Adhesion endurance | | ◯ | ◯ | ◯ | ◯ |
| | | Heating buckling resistance | | ◯ | ◯ | ◯ | ◯ |
| | | Crack resistance | | ◯ | ◯ | ◯ | ◯ |
| | | Pot life of Adhesive liquid | | ◯ | ◯ | ◯ | ◯ |

| | | | | Example 5 | Example 6 | Example 7 | Example 8 |
|---|---|---|---|---|---|---|---|
| Active-energy-ray-curable adhesive composition (parts by weight) | Radical polymerizable compounds | Alkyl (meth)acrylates (A) having 10 to 20 carbon atoms | ISTA (A2) | 46.1 | 31.1 | 26.2 | 81.9 |
| | | | LIGHT ACRYLATE L-A (A1) | 11.9 | 7.7 | 17.5 | — |
| | | Nitrogen-containing | HEAA | — | — | — | — |

TABLE 1-continued

|  |  |  |  |  |  |  |
|---|---|---|---|---|---|---|
|  | monomers (B) | ACMO | 30.8 | 23.1 | 34.1 | 6.9 |
|  | Radical polymerizable | 4HBA | — | 22.1 | — | — |
|  | compounds having hydroxyl | PLACCEL FA1DDM | 3.5 | — | 3.9 | 3.5 |
|  | group | Methacrylamidephenylboric acid | — | 1.0 | — | — |
|  | Polyfunctional radical | TPGDA | — | — | — | — |
|  | polymerizable compounds | LIGHT ACRYLATE 9EG-A | — | — | — | — |
|  |  | LIGHT ACRYLATE 1,9NDA | 7.7 | 15.0 | 12.7 | 7.7 |
|  | Radical polymerizable compound having active methylene group | AAEM | — | — | 5.7 | — |
|  | Alkyl (meth)acrylates | BA | — | — | — | — |
|  | having 2 to 9 carbon atoms | 2EHA | — | — | — | — |
|  | Acrylic oligomer | UP-1190 | 15.3 | 15.3 | 33.1 | 15.3 |
|  | Radical polymerization initiator having hydrogen-withdrawing effect | KAYACURE DETX-S | 3.5 | 3.5 | 3.9 | 3.5 |
|  | Photopolymerization initiator | IRGACURE 907 | 3.5 | 3.5 | 3.9 | 3.5 |
|  | Crosslinking agent | CORONATE L | 4.3 | 4.3 | — | 4.3 |
|  |  | Viscosity (cp/25° C.) | 23 | 20 | 27 | 32 |
| Adhesive layer (a) or | Glass transition temperature (° C.) |  | 16 | 15 | 15 | −10 |
| pressure-sensitive |  | (A1/A2) | 2.0/8.0 | 2.0/8.0 | 4.0/6.0 | 0/10 |
| adhesive layer |  | Thickness (μm) | 1.1 | 1.0 | 1.0 | 1.0 |
| Evaluations | Adhering strength (N/15-mm) | At ordinary time | 0.8 | 0.9 | 0.8 | 0.7 |
|  | between polarizer and liquid | After film-immersion in water of 25° C. temperature | 0.8 | 0.8 | 0.7 | 0.6 |
|  | crystal type retardation film | After humidification of film | 0.7 | 0.7 | 0.7 | 0.6 |
|  | Impact resistance after humidification |  | ◯ | ◯ | ◯ | ◯ |
|  | Adhesion endurance |  | ◯ | ◯ | ◯ | ◯ |
|  | Heating buckling resistance |  | ◯ | ◯ | ◯ | ◯ |
|  | Crack resistance |  | ◯ | ◯ | ◯ | ◯ |
|  | Pot life of Adhesive liquid |  | ◯ | ◯ | ◯ | ◯ |

TABLE 2

|  |  |  |  | Example 9 | Example 10 | Example 11 | Example 12 |
|---|---|---|---|---|---|---|---|
| Active-energy-ray- | Radical | Alkyl (meth) acrylates (A) | ISTA (A2) | 88.8 | 23.1 | 68.4 | 29.0 |
| curable adhesive | polymerizable | having 10 to 20 carbon | LIGHT ACRYLATE L-A (A1) | — | 11.8 | 18.5 | 29.0 |
| composition | compounds | atoms |  |  |  |  |  |
| (parts by weight) |  | Nitrogen-containing | HEAA | — | — | — | — |
|  |  | monomers (B) | ACMO | — | 30.8 | 2.0 | 30.8 |
|  |  | Radical polymerizable | 4HBA | — | — | — | — |
|  |  | compounds having hydroxyl | PLACCEL FA1DDM | 3.5 | 3.5 | 3.5 | 3.5 |
|  |  | group | Methacrylamidephenylboric acid | — | — | — | — |
|  |  | Polyfunctional radical | TPGDA | — | — | — | — |
|  |  | polymerizable compounds | LIGHT ACRYLATE 9EG-A | — | — | — | — |
|  |  |  | LIGHT ACRYLATE 1,9NDA | 7.7 | 30.8 | 7.7 | 7.7 |
|  |  | Radical polymerizable compound having active methylene group | AAEM | — | — | — | — |
|  |  | Alkyl (meth)acrylates | BA | — | — | — | — |
|  |  | having 2 to 9 carbon atoms | 2EHA | — | — | — | — |
|  |  | Acrylic oligomer | UP-1190 | 15.3 | 12.7 | 15.3 | 15.3 |
|  | Radical polymerization initiator having hydrogen-withdrawing effect |  | KAYACURE DETX-S | 3.5 | 3.5 | 3.5 | 3.5 |
|  | Photopolymerization initiator |  | IRGACURE 907 | 3.5 | 3.5 | 3.5 | 3.5 |
|  | Crosslinking agent |  | CORONATE L | 4.3 | — | 4.3 | — |
|  |  |  | Viscosity (cp/25° C.) | 34 | 21 | 22 | 19 |
| Adhesive layer (a) or |  | Glass transition temperature (° C.) |  | −16 | 42 | −13 | 18 |
| pressure-sensitive |  |  | (A1/A2) | 0/10 | 3.4/6.6 | 2.1/7.9 | 5.0/5.0 |
| adhesive layer |  |  | Thickness (μm) | 1.0 | 1.0 | 1.0 | 1.0 |
| Evaluations | Adhering strength (N/15-mm) |  | At ordinary time | 0.6 | 0.7 | 0.7 | 0.7 |
|  | between polarizer and liquid |  | After film-immersion in water of 25° C. temperature | 0.5 | 0.6 | 0.6 | 0.6 |
|  | crystal type retardation film |  | After humidification of film | 0.5 | 0.6 | 0.6 | 0.6 |
|  | Impact resistance after humidification |  |  | ◯ | ◯ | ◯ | ◯ |
|  | Adhesion endurance |  |  | ◯ | ◯ | ◯ | ◯ |
|  | Heating buckling resistance |  |  | ◯ | ◯ | ◯ | ◯ |
|  | Crack resistance |  |  | ◯ | ◯ | ◯ | ◯ |
|  | Pot life of Adhesive liquid |  |  | ◯ | ◯ | ◯ | ◯ |

TABLE 2-continued

| | | | | Example 13 | Example 14 | Example 15 |
|---|---|---|---|---|---|---|
| Active-energy-ray-curable adhesive composition (parts by weight) | Radical polymerizable compounds | Alkyl (meth)acrylates (A) having 10 to 20 carbon atoms | ISTA (A2) | 35.9 | 50.0 | 46.1 |
| | | | LIGHT ACRYLATE L-A (A1) | 13.0 | 12.9 | 11.9 |
| | | Nitrogen-containing monomers (B) | HEAA | — | — | — |
| | | | ACMO | 36.1 | 33.4 | 30.8 |
| | | Radical polymerizable compounds having hydroxyl group | 4HBA | — | — | — |
| | | | PLACCEL FA1DDM | — | 3.7 | 3.5 |
| | | | Methacrylamidephenylboric acid | — | — | — |
| | | Polyfunctional radical polymerizable compounds | TPGDA | — | — | — |
| | | | LIGHT ACRYLATE 9EG-A | — | — | 7.7 |
| | | | LIGHT ACRYLATE 1,9NDA | 15.0 | — | — |
| | | Radical polymerizable compound having active methylene group | AAEM | — | — | — |
| | | Alkyl (meth)acrylates having 2 to 9 carbon atoms | BA | — | — | — |
| | | | 2EHA | — | — | — |
| | | Acrylic oligomer | UP-1190 | 15.3 | 15.3 | 15.3 |
| | Radical polymerization initiator having hydrogen-withdrawing effect | | KAYACURE DETX-S | 3.5 | 3.5 | 3.5 |
| | Photopolymerization initiator | | IRGACURE 907 | 3.5 | 3.5 | 3.5 |
| | Crosslinking agent | | CORONATE L | 4.3 | 4.3 | 4.3 |
| Adhesive layer (a) or pressure-sensitive adhesive layer Evaluations | Viscosity (cp/25° C.) | | | 25 | 22 | 22 |
| | Glass transition temperature (° C.) | | | 28 | 12 | 12 |
| | (A1/A2) | | | 2.7/7.3 | 2.0/8.0 | 2.0/8.0 |
| | Thickness (μm) | | | 1.0 | 1.0 | 1.0 |
| | Adhering strength (N/15-mm) between polarizer and liquid crystal type retardation film | At ordinary time | | 0.5 | 0.7 | 0.7 |
| | | After film-immersion in water of 25° C. temperature | | 0.5 | 0.6 | 0.6 |
| | | After humidification of film | | 0.5 | 0.6 | 0.6 |
| | Impact resistance after humidification | | | Δ | ○ | ○ |
| | Adhesion endurance | | | ○ | Δ | ○ |
| | Heating buckling resistance | | | ○ | ○ | ○ |
| | Crack resistance | | | ○ | Δ | ○ |
| | Pot life of Adhesive liquid | | | ○ | ○ | Δ |

TABLE 3

| | | | | Comparative Example 1 | Comparative Example 2 | Comparative Example 3 |
|---|---|---|---|---|---|---|
| Active-energy-ray-curable adhesive composition (parts by weight) | Radical polymerizable compounds | Alkyl (meth) acrylates (A) having 10 to 20 carbon atoms | ISTA (A2) | — | — | — |
| | | | LIGHT ACRYLATE L-A (A1) | — | — | — |
| | | Nitrogen-containing monomers (B) | HEAA | 35.0 | — | — |
| | | | ACMO | 40.0 | — | 30.8 |
| | | Radical polymerizable compounds having hydroxyl group | 4HBA | — | 38.5 | — |
| | | | PLACCEL FA1DDM | — | — | 61.5 |
| | | | Methacrylamidephenylboric acid | — | — | — |
| | | Polyfunctional radical polymerizable compounds | TPGDA | 25.0 | 53.8 | — |
| | | | LIGHT ACRYLATE 9EG-A | — | — | 7.7 |
| | | | LIGHT ACRYLATE 1,9NDA | — | — | — |
| | | Radical polymerizable compound having active methylene group | AAEM | — | 7.7 | — |
| | | Alkyl (meth)acrylates having 2 to 9 carbon atoms | BA | — | — | — |
| | | | 2EHA | — | — | — |
| | | Acrylic oligomer | UP-1190 | — | 28.2 | 15.3 |
| | Radical polymerization initiator having hydrogen-withdrawing effect | | KAYACURE DETX-S | 3.0 | 2.8 | 3.5 |
| | Photopolymerization initiator | | IRGACURE 907 | 3.0 | 2.8 | 3.5 |
| | Crosslinking agent | | CORONATE L | — | — | — |
| Adhesive layer (a) or pressure-sensitive adhesive layer Evaluations | Viscosity (cp/25° C.) | | | 35 | 30 | 37 |
| | Glass transition temperature (° C.) | | | 119 | 3 | 13 |
| | (A1/A2) | | | 0/0 | 0/0 | 0/0 |
| | Thickness (μm) | | | 1.0 | 1.0 | 1.1 |
| | Adhering strength (N/15-mm) between polarizer and liquid crystal type retardation film | At ordinary time | | 0.5 | 0.3 | 0.5 |
| | | After film-immersion in water of 25° C. temperature | | 0.2 | 0.3 | 0.1 |
| | | After humidification of film | | 0.1 | 0.2 | 0.1 |
| | Impact resistance after humidification | | | X | Δ | Δ |
| | Adhesion endurance | | | ○ | ○ | ○ |
| | Heating buckling resistance | | | ○ | ○ | ○ |

TABLE 3-continued

|  |  |  |  | | | |
|---|---|---|---|---|---|---|
|  |  |  | Crack resistance | | ◯◯ | ◯ |
|  |  |  | Pot life of Adhesive liquid | ◯ | ◯ | ◯ |

|  |  |  |  | Comparative Example 4 | Comparative Example 5 | Comparative Example 6 |
|---|---|---|---|---|---|---|
| Active-energy-ray-curable adhesive composition (parts by weight) | Radical polymerizable compounds | Alkyl (meth)acrylates (A) having 10 to 20 carbon atoms | ISTA (A2) | 10.0 | — | — |
|  |  |  | LIGHT ACRYLATE L-A (A1) | 3.0 | — | — |
|  |  | Nitrogen-containing monomers (B) | HEAA | — | — | — |
|  |  |  | ACMO | 23.1 | — | — |
|  |  | Radical polymerizable compounds having hydroxyl group | 4HBA | — | 40.0 | 40.0 |
|  |  |  | PLACCEL FA1DDM | 48.9 | — | — |
|  |  |  | Methacrylamidephenylboric acid | — | — | — |
|  |  | Polyfunctional radical polymerizable compounds | TPGDA | — | 20.0 | — |
|  |  |  | LIGHT ACRYLATE 9EG-A | — | — | 20.0 |
|  |  |  | LIGHT ACRYLATE 1,9NDA | 15.0 | — | — |
|  |  | Radical polymerizable compound having active methylene group | AAEM | — | — | — |
|  |  | Alkyl (meth)acrylates having 2 to 9 carbon atoms | BA | — | 40.0 | 40.0 |
|  |  |  | 2EHA | — | — | — |
|  |  | Acrylic oligomer | UP-1190 | 15.3 | — | — |
|  | Radical polymerization initiator having hydrogen-withdrawing effect |  | KAYACURE DETX-S | 3.5 | 3.0 | 3.0 |
|  | Photopolymerization initiator |  | IRGACURE 907 | 3.5 | 3.0 | 3.0 |
|  | Crosslinking agent |  | CORONATE L | — | — | — |
| Adhesive layer (a) or pressure-sensitive adhesive layer Evaluations | Viscosity (cp/25° C.) | | | 14 | 11 | 11 |
|  | Glass transition temperature (° C.) | | | 12 | −23 | −28 |
|  | (A1/A2) | | | 2.3/7.7 | 0/0 | 0/0 |
|  | Thickness (μm) | | | 1.0 | 1.0 | 1.0 |
|  | Adhering strength (N/15-mm) between polarizer and liquid crystal type retardation film | At ordinary time | | 0.4 | 0.4 | 0.4 |
|  |  | After film-immersion in water of 25° C. temperature | | 0.2 | 0.3 | 0.3 |
|  |  | After humidification of film | | 0.2 | 0.2 | 0.2 |
|  | Impact resistance after humidification | | | Δ | Δ | Δ |
|  | Adhesion endurance | | | ◯ | ◯ | ◯ |
|  | Heating buckling resistance | | | ◯ | ◯ | ◯ |
|  | Crack resistance | | | ◯ | ◯ | ◯ |
|  | Pot life of Adhesive liquid | | | ◯ | ◯ | ◯ |

In Tables 1 to 3, radical polymerizable compounds are as follows:

(A) Alkyl (meth)acrylates (A) having 10 to 20 carbon atoms:
  ISTA: isostearyl acrylate, which is an alkyl (meth)acrylate (A2) having 18 carbon atoms, manufactured by Osaka Organic Chemical Industry Ltd.; and
  LIGHT ACRYLATE L-A: lauryl acrylate, which is an alkyl (meth)acrylate (A1) having 12 carbon atoms, manufactured by Kyoeisha Chemical Co., Ltd.

(B) Nitrogen-containing monomers (B):
  HEAA: hydroxyethylacrylamide, manufacturedbyKohjin Co., Ltd.; and
  ACMO: acryloylmorpholine, manufactured by Kohjin Co., Ltd.

(C) Radical polymerizable compounds having a hydroxyl group:
  4HBA: 4-hydroxybutyl acrylate, manufactured by Osaka Organic Chemical Industry Ltd.;
  PLACCEL FA1DDM: one-mole-caprolactone added product of 2HEA, manufactured by Daicel Corp.; and
  Methacrylamideboric acid, manufactured by Junsei Chemical Co., Ltd.

(D) Polyfunctional radical polymerizable compounds:
  TPGDA: tripropylene glycol diacrylate, manufactured by Toagosei Co., Ltd.;
  LIGHT ACRYLATE 9EG-A: ethylene glycol (average value of added mole numbers: 9) diacrylate, manufactured by Kyoeisha Chemical Co., Ltd.; and
  LIGHT ACRYLATE 1,9NDA: 1,9-nonanediol diacrylate, manufactured by Kyoeisha Chemical Co., Ltd.

(E) Radical polymerizable compound having an active methylene group:
  AAEM: 2-acetoacetoxyethyl methacrylate, manufactured by the Nippon Synthetic Chemical Industry Co., Ltd.

(F) Acrylic oligomer yielded by polymerizing a (meth)acrylic monomer:
  UP-1190 (ARUFON UP-1190), manufactured by Toagosei Co., Ltd.

(H) Alkyl (meth)acrylates having 2 to 9 carbon atoms:
  BA: butyl acrylate, manufactured by Nippon Shokubai Co., Ltd.; and
  2EHA: 2-ethylhexyl acrylate (manufactured by Nippon Shokubai Co., Ltd.)

(H) Radical polymerization initiator having hydrogen-withdrawing effect:
  KAYACURE DETX-S: diethylthioxanthone, manufactured by Nippon Kayaku Co., Ltd.

(I) Others:
  Photopolymerization Initiator:
  IRGACURE 907 (compound represented by the general formula (2)):
  2-methyl-1-(4-methylthiophenyl)-2-morpholinopropane-1-one, manufactured by the company BASF; and
  Crosslinking Agent:
  CORONATE L: (Adduct of trimethylolpropane and tolylene diisocyanate, manufactured by Nippon Polyurethane Industry Co., Ltd.

DESCRIPTION OF REFERENCE SIGNS

1: Polarizer
2: Transparent protective film(s)
P: Polarizing film
3: Optical film(s) (Retardation film(s))
a: Adhesive layer(s)
b: Adhesive layer(s)

The invention claimed is:

1. A polarizing film, comprising:
a polarizer,
a first transparent protective film laid on/over a first surface of the polarizer to interpose an adhesive layer (a) between the first surface and the first transparent protective film, and films;
a second transparent protective film laid on/over a second surface of the polarizer to interpose an adhesive layer (b) between the second surface and the second transparent protective film;
wherein the adhesive layer (a) on/over the first surface has a glass transition temperature of −60° C. or higher and lower than 40° C.;
wherein the adhesive layer (b) on/over the second ether surface has a glass transition temperature of 40° C. or higher and 300° C. or lower;
wherein a difference in the glass transition temperature of the adhesive layer (a) and the glass transition temperature of the adhesive layer (b) is 60° C. or more;
wherein the adhesive layer (a) is a layer formed in the form of a cured product layer yielded by radiating an active energy ray to an active-energy-ray-curable adhesive composition (a); and
wherein the active-energy-ray-curable adhesive composition (a) comprises at least one or more radical polymerizable compounds, and when a total amount of the radical polymerizable compound(s) is defined as 100% by weight, one or more alkyl (meth)acrylates (A) each having 10 to 20 carbon atoms are comprised in a proportion of 15% or more by weight.

2. The polarizing film according to claim 1, wherein the active-energy-ray-curable adhesive composition (a) comprises, as the alkyl (meth)acrylate(s) (A), an alkyl (meth)acrylate (A1) having 10 to 14 carbon atoms, and an alkyl (meth)acrylate (A2) having 15 to 20 carbon atoms.

3. The polarizing film according to claim 2, wherein in the active-energy-ray-curable adhesive composition (a), a ratio by weight of the component (A1) to the component (A2) (A1/A2) is from 1.0/9.0 to 4.0/6.0.

4. The polarizing film according to claim 1, comprising the following in an amount of 3% or more by weight at the time of defining the total amount of the radical polymerizable compound(s) as 100% by weight: one or more nitrogen-containing monomers (B) selected from the group consisting of (meth)acrylamide derivatives, amino-group-containing monomers, and nitrogen-containing and heterocycle-containing vinyl monomers.

5. The polarizing film according to claim 1, wherein the active-energy-ray-curable adhesive composition (a) further comprises a polyfunctional radical polymerizable compound.

6. The polarizing film according to claim 5, wherein in the active-energy-ray-curable adhesive composition (a), the polyfunctional radical polymerizable compound is an alkylene di(meth)acrylate having 7 to 12 carbon atoms.

7. The polarizing film according to claim 1, wherein the active-energy-ray-curable adhesive composition (a) further comprises an acrylic oligomer obtained by polymerizing a (meth)acrylic monomer.

8. The polarizing film according to claim 1, wherein the active-energy-ray-curable adhesive composition (a) comprises a radical polymerizable compound having a hydroxyl group.

9. The polarizing film according to claim 1, wherein the active-energy-ray-curable adhesive composition (a) further comprises a silane coupling agent.

10. The polarizing film according to claim 9, wherein in the active-energy-ray-curable adhesive composition (a), the silane coupling agent is a silane coupling agent having no radical polymerizable functional group.

11. The polarizing film according to claim 1, wherein the active-energy-ray-curable adhesive composition (a) comprises a radical polymerizable compound having an active methylene group, and a radical polymerization initiator having hydrogen-withdrawing effect.

12. The polarizing film according to claim 11, wherein in the active-energy-ray-curable adhesive composition (a), the active methylene group is an acetoacetyl group.

13. The polarizing film according to claim 11, wherein in the active-energy-ray-curable adhesive composition (a), the radical polymerizable compound having the active methylene group is acetoacethoxyalkyl (meth)acrylate.

14. The polarizing film according to claim 11, wherein in the active-energy-ray-curable adhesive composition (a), the radical polymerization initiator is a thioxanthone based radical polymerization initiator.

15. A method for producing the polarizing film recited in claim 1, comprising:
a first painting step of painting an adhesive composition (b) for forming the adhesive layer (b) to at least the second surface of the polarizer and the second transparent protective film,
a first bonding step of bonding the polarizer and the second transparent protective film to each other,
a first adhering step of causing the polarizer and the second transparent protective film to adhere to each other through the adhesive layer (b) yielded by curing the adhesive composition (b),
a second painting step of painting an active-energy-ray-curable adhesive composition (a) for forming the adhesive layer (a) to at least the first surface of the polarizer and the first transparent protective film,
a second bonding step of bonding the polarizer and the first transparent protective film to each other, and
a second adhering step of radiating the active energy ray to the resultant workpiece to cure the active-energy-ray-curable adhesive composition (a) to yield the adhesive layer (a), and causing the polarizer and the first transparent protective film to adhere to each other through the yielded adhesive layer (a).

16. The method for producing the polarizing film according to claim 15, wherein the active energy ray shows a ratio of 100:0 to 100:50, this ratio being a ratio between an integrated illuminance of rays in a wavelength range from 380 to 440 nm and an integrated illuminance of rays in a wavelength range from 250 to 370 nm.

17. A method for producing the polarizing film recited in claim 1, comprising:
a painting step of painting an active-energy-ray-curable adhesive composition (b) for forming the adhesive layer (b) to at least the second surface of the polarizer and the second transparent protective film, another painting step of painting an active-energy-ray-curable adhesive composition (a) for forming the adhesive layer (a) to at least the first surface of the polarizer and the first transparent protective film, a bonding step of bonding the polarizer to the first and second transparent protective films, and an adhering step of radiating the active energy ray to the resultant workpiece to cure the active-energy-ray-curable adhesive compositions (a) and (b) to yield the adhesive layer (a) and the adhesive layer (b), and causing the first and second transparent protective films to adhere to the polarizer through the yielded adhesive layer (a) and the yielded adhesive layer (b), respectively.

18. An optical film, comprising at least one polarizing film as recited in claim 1.

19. An image display device, comprising a polarizing film as recited in claim 1.

* * * * *